United States Patent [19]

Wray et al.

[11] E Re. 29,562

[45] Reissued Mar. 7, 1978

[54] METHOD AND APPARATUS FOR TESTING WELLS

[75] Inventors: Gary Q. Wray, Duncan, Okla.; George E. Petty, Ventura, Calif.

[73] Assignee: Halliburton Company, Duncan, Okla.

[21] Appl. No.: 679,256

[22] Filed: Apr. 22, 1976

Related U.S. Patent Documents

Reissue of:

[64] Patent No.: 3,664,415
Issued: May 23, 1972
Appl. No.: 71,695
Filed: Sep. 14, 1970

[51] Int. Cl.[2] ..... E21B 27/00

[52] U.S. Cl. ..... 166/.5; 166/162; 166/164; 251/63

[58] Field of Search ..... 166/.5, .6, 72, 162, 166/165, 169, 224 R, 224 A, 264, 164; 73/151; 137/495; 251/63

[56] References Cited

U.S. PATENT DOCUMENTS

| | | | |
|---|---|---|---|
| 2,033,563 | 3/1936 | Wells | 166/72 |
| 2,951,536 | 9/1960 | Garrett | 166/145 |
| 3,236,255 | 2/1966 | Sizer | 137/495 |
| 3,273,647 | 9/1966 | Briggs, Jr. et al. | 166/196 X |
| 3,327,781 | 6/1967 | Nutter | 166/250 |
| 3,353,605 | 11/1967 | Garrett et al. | 166/53 |
| 3,358,755 | 12/1967 | Chisholm | 166/264 |
| 3,410,346 | 11/1968 | Garrett et al. | 166/53 |
| 3,451,475 | 6/1969 | Price | 166/.5 |
| 3,456,726 | 7/1969 | Barrington et al. | 166/169 X |

*Primary Examiner*—Ernest R. Purser
*Assistant Examiner*—Richard E. Favreau
*Attorney, Agent, or Firm*—Floyd A. Gonzalez; James E. Cockfield; John H. Tregoning

[57] ABSTRACT

A method and apparatus for testing offshore wells where variations in well annulus pressure are utilized to control the valving operation of a testing tool and entrap a formation sample.

A confined body of pressurized fluid positoned in a testing string is utilized to predetermine the annulus pressure changes which will effect said valving and sample entrapping operations.

28 Claims, 15 Drawing Figures

Figure 1:
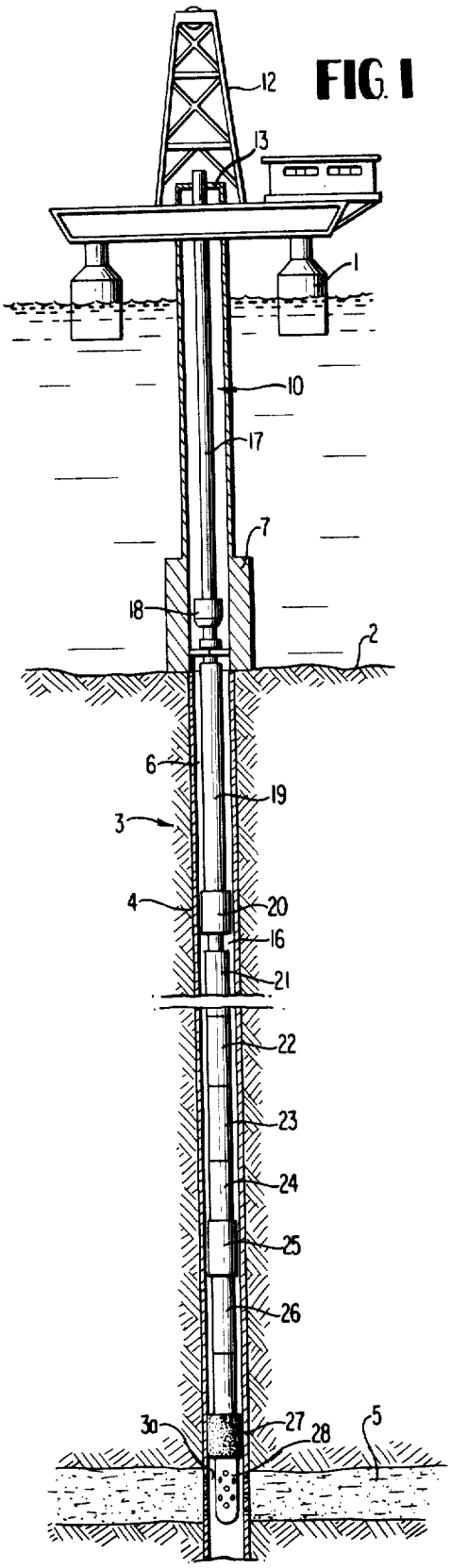

FIG. 3e
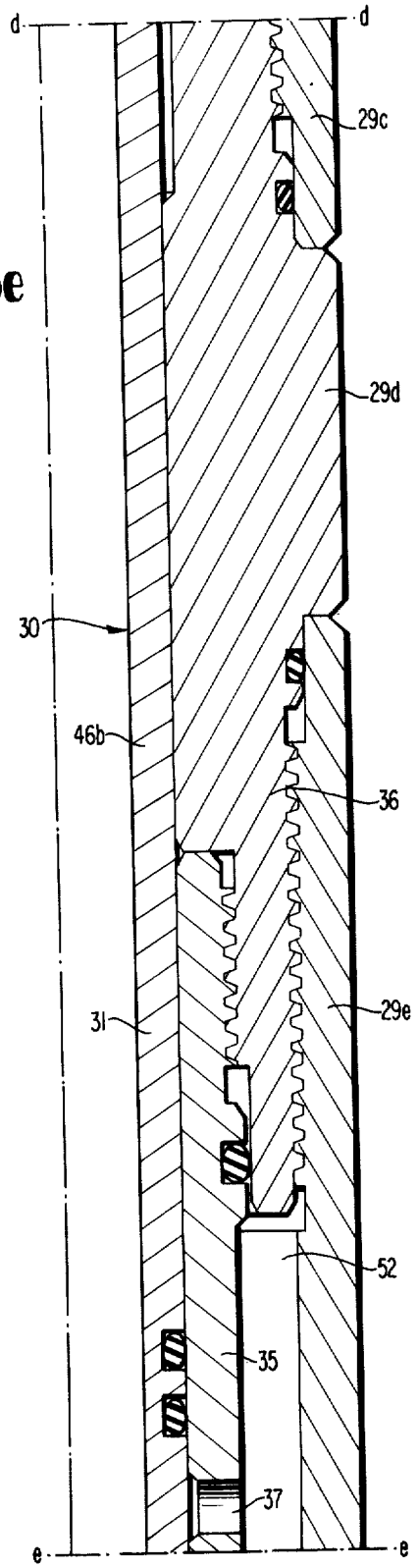
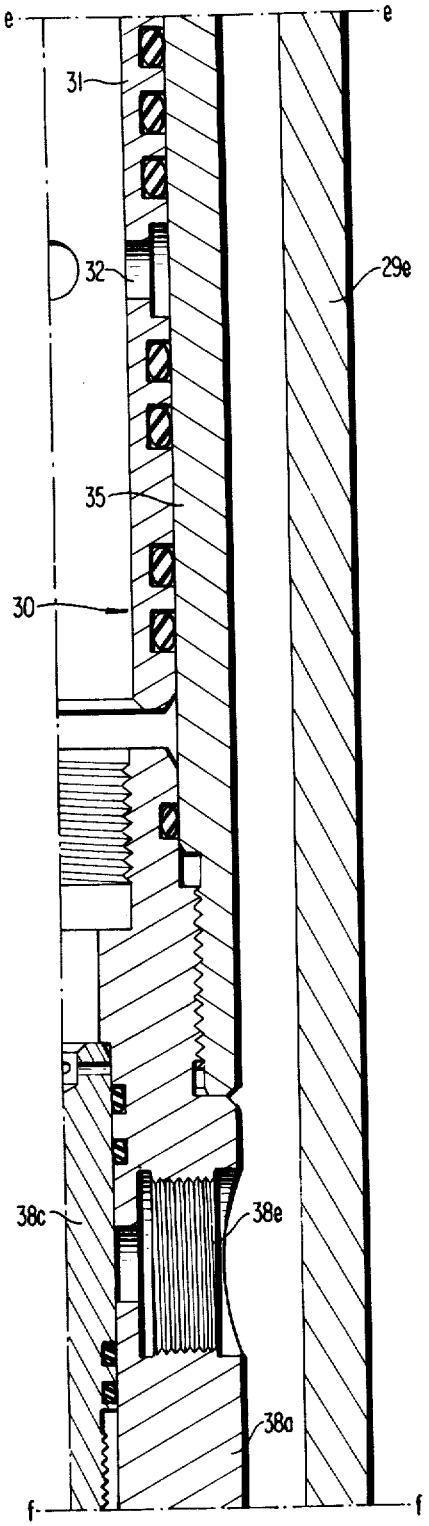
FIG. 3f

METHOD AND APPARATUS FOR TESTING WELLS

Matter enclosed in heavy brackets [ ] appears in the original patent but forms no part of this reissue specification; matter printed in italics indicates the additions made by reissue.

GENERAL BACKGROUND OF INVENTION

For several decades those skilled in the oil and gas well art have utilized techniques for predicting the characteristics of oil and gas bearing formations.

One such technique, generally known as formation testing, entails the insertion of a testing string or conduit into a well, which well intersects a formation to be tested.

The conduit string is sealed to the well wall by a selectively operable packer. This sealing places the interior of the conduit string in communication with the formation, with the formation and interior of the conduit string being isolated from a well annulus which is located above the packer and encircles the conduit string.

Conventionally, rotary or linear reciprocations of the conduit string, or combined manipulations of this nature, or the utilization of separate actuating tools, have been employed to effect a sequence of testing operations.

This sequence of testing operations often entails the opening and closing of a valve in the conduit string, during which time the pressure of formation fluid flowing through the conduit string is measured. When the interior of the conduit string is closed, pressure of fluid below the closed portion of the conduit string will be measured as "closed-in" pressure. When the conduit string is opened, pressure formation flowing through the conduit string will be measured as "flowing" pressure.

In conjunction with such pressure measurements, it has been conventional to entrap a sample of formation fluid flowing through the conduit string. After the sample chamber has been trapped, the trapped sample has been moved, with the conduit string, through the well to a work site where the sample was analyzed, or transported to an analysis station.

The sample entrapping operation, like the pressure measuring operation, usually has requred manipulations of the conduit string and/or the use of a separate actuating tool.

Even in connection with conventional "dry land" operations, the conduit string manipulations generally utilized in conducting pressure evaluations and sample entrapment have created substantial difficulties and uncertainties. Indeed, the history of the testing art is replete with attempts to provide more reliable testing tools, with manipulations being reduced to a minimum level.

As the petroleum industry moved offshore in recent years, the problems involved in formation testing have assumed even greater difficulty and uncertainty. In addition to the conventional problems associated with formation testing, offshore operations introduced additional complications, some attributable to wave action induced movement of floating drilling vessels, from which vessels testing operations are often conducted.

With particular reference to offshore testing operations, but with a perspective directed to overall testing operations of an offshore or dry land nature, it has been a basic goal of the industry to provide a formation testing technique where the problems of conduit string manipulations would be eliminated or minimized and optimum control and safety maintained during a testing operation.

It is with respect to this basic goal that this invention is concerned.

GENERAL SUMMARY OF INVENTION

To a substantial extent, fulfillment of the basic goal outlined above is achieved through the presentation of a method and apparatus for testing a formation where changes in well annulus pressure are selectively employed. These changes induce valving and sample entrapping movements of components contained within a stationary testing tool disposed in a well bore.

Predetermined control of the reponse to the testing tool components to such pressure changes is desirably effected by the utilization of a pre-pressurized body of fluid contained within the testing means. It is contemplated that particularly effective results are achieved when the pressurized fluid constitutes a body of pressurized nitrogen.

A most significant facet of the invention is directed to a method of testing a submerged formation from an offshore test site. In this optimum method, an operator maintains pressure in a body of fluid in a submerged well bore, disposed adjacent a conduit means, at a relatively low level, while maintaining this body of fluid isolated from a submerged formation to be tested. In response to this relatively low level of pressure in the body of fluid, a flow path leading from the formation, through the conduit means, is maintained in a closed condition.

The pressure of the fluid body is increased, while isolating the increase in pressure of the fluid body from the formation. In response to this pressure increase, fluid is permitted to flow from the formation through the conduit means. The pressure of fluid in the fluid body is further changed, while isolating the further increase in pressure from the formation. In response to this further change in pressure, a sample of formation fluid is entrapped within the conduit means.

Additionally, significant facets of the invention are directed to releasable restraining means and impedance mechanisms for providing reliability and predictability with respect to the response of tool components to variations of pressure in the fluid body.

A pressure and volume balanced, selectively expansible and contractible coupling means may be employed to effectively prevent wave action generated force from being transmitted from a floating test control site to test string conduit means containing a sample entrapping chamber and sample flow controlling valve mechanism. This isolation may be enhanced by supporting an upper portion of the string in a submerged well head, with the floating test site being free to move up and down in longitudinally movable relation with the test string.

An automatic venting arrangement may be utilized to vent pressure trapped in a test string below the test string conduit means housing the sample entrapping chamber and valve mechanism. This venting may automatically occur as the conduit means is raised upwardly through a well bore at the conclusion of a testing operation.

Additional significant facets of the invention are directed to unique combinations of elements which interact to perform the functions above noted.

A major contribution is believed to be attributable to a control method and apparatus where a differential piston is concurrently acted upon by a test string carried body of pressurized fluid and annulus pressure. Selective variations in an annulus pressure are employed to induce manipulation of this differential piston so as to perform valving and sample entrapping manipulations.

DRAWINGS

In describing the invention, reference will be made to a preferred embodiment shown in the appended drawings.

Figure 1A:
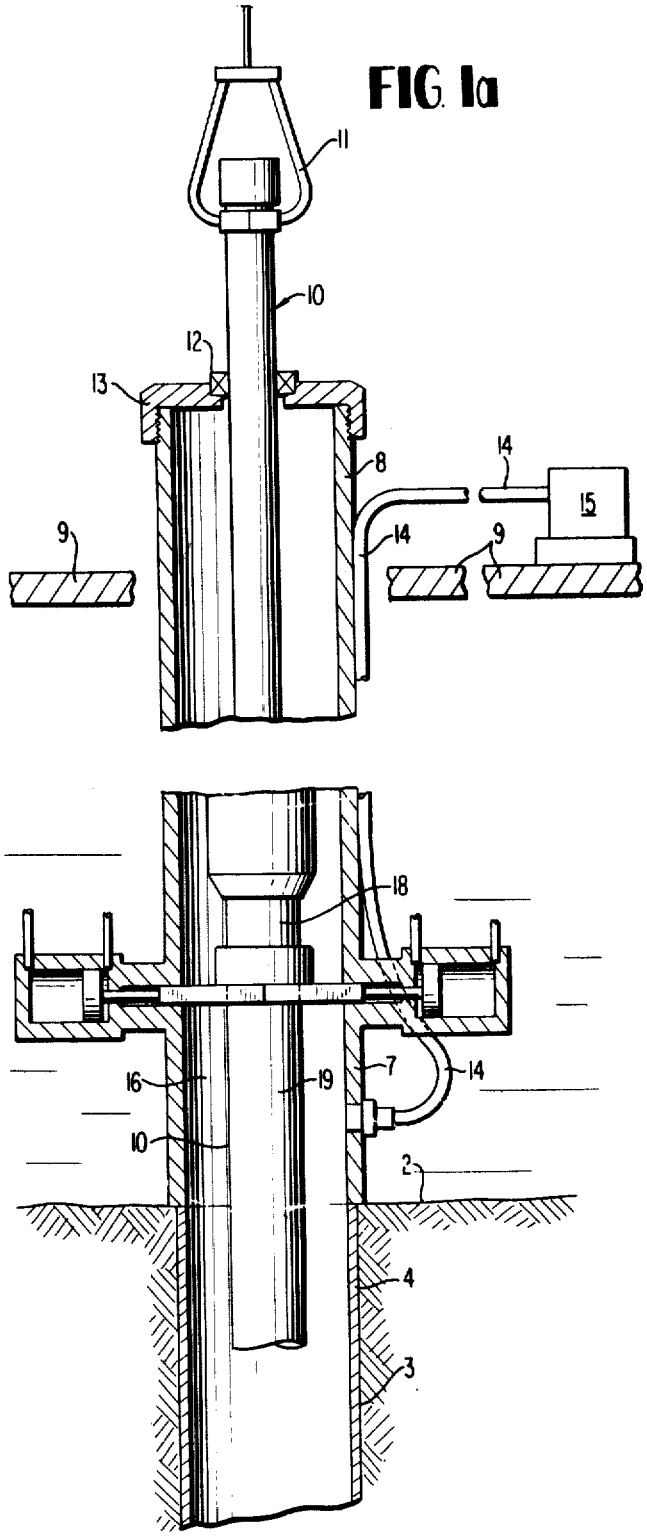
Figure 2C:
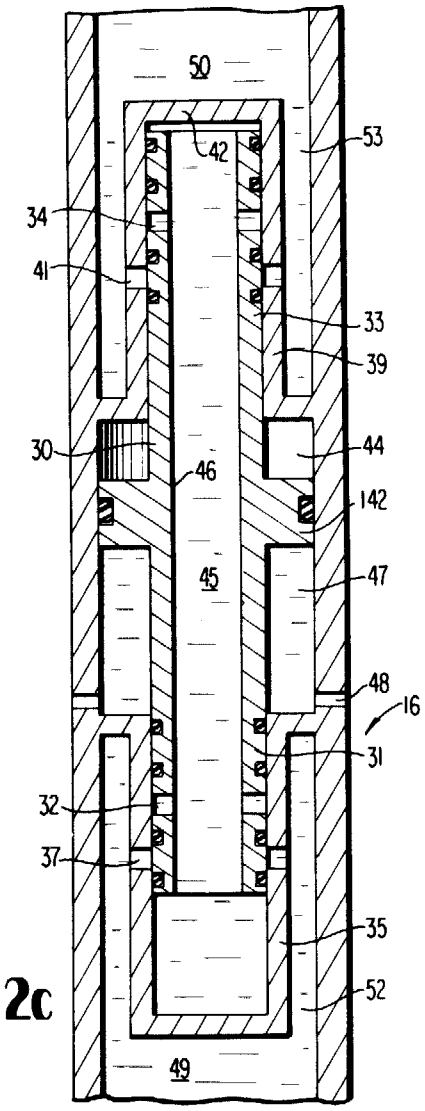
Figure 2B:
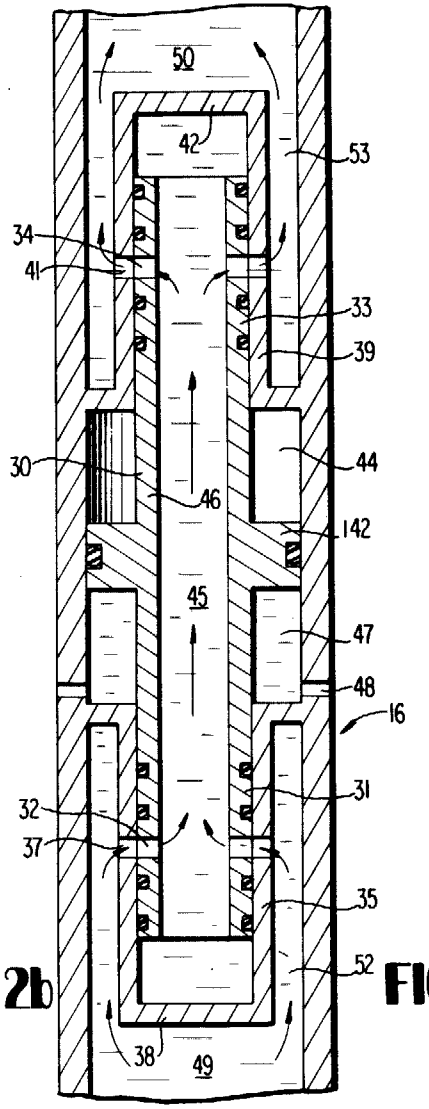
Figure 2A:
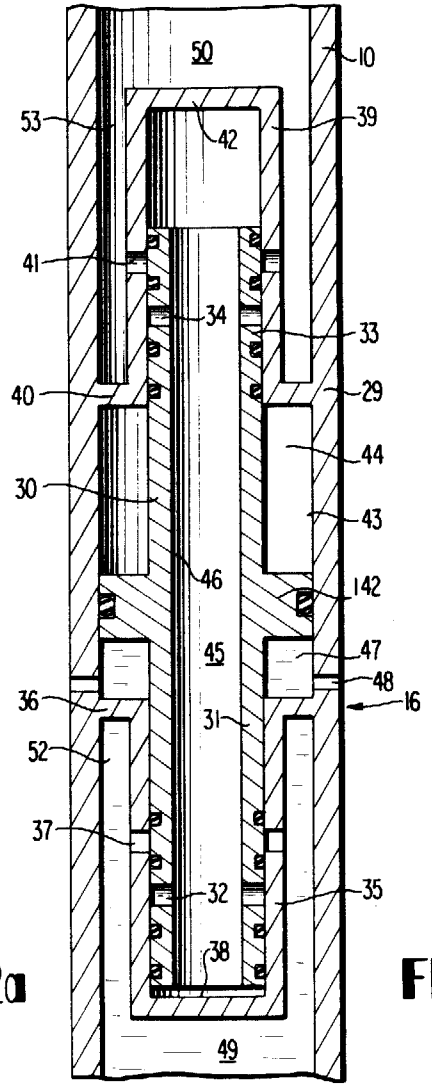
Figure 3A:
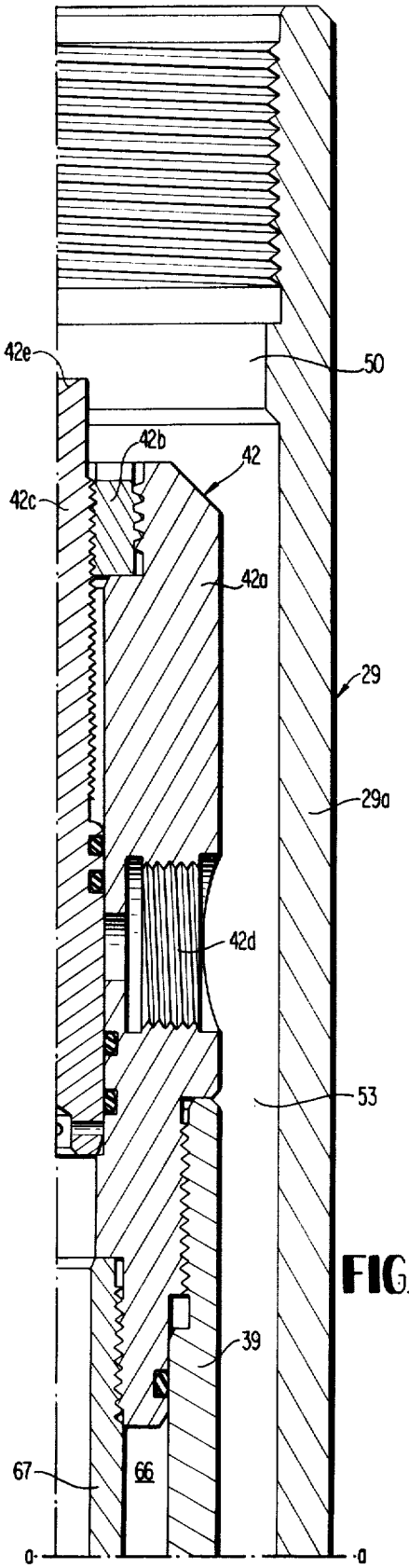
Figure 3B:
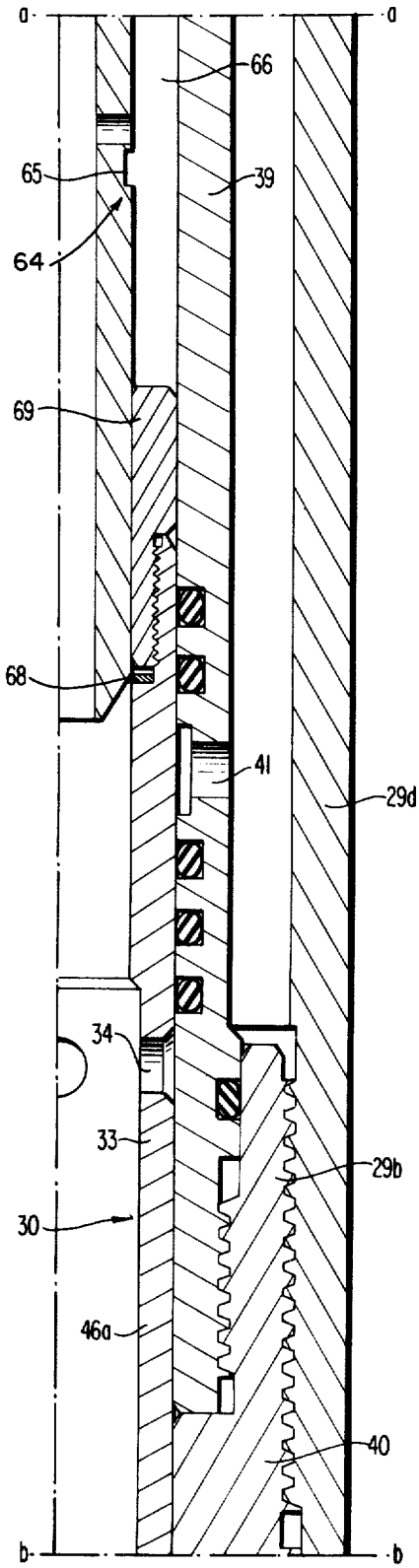
Figure 3C:
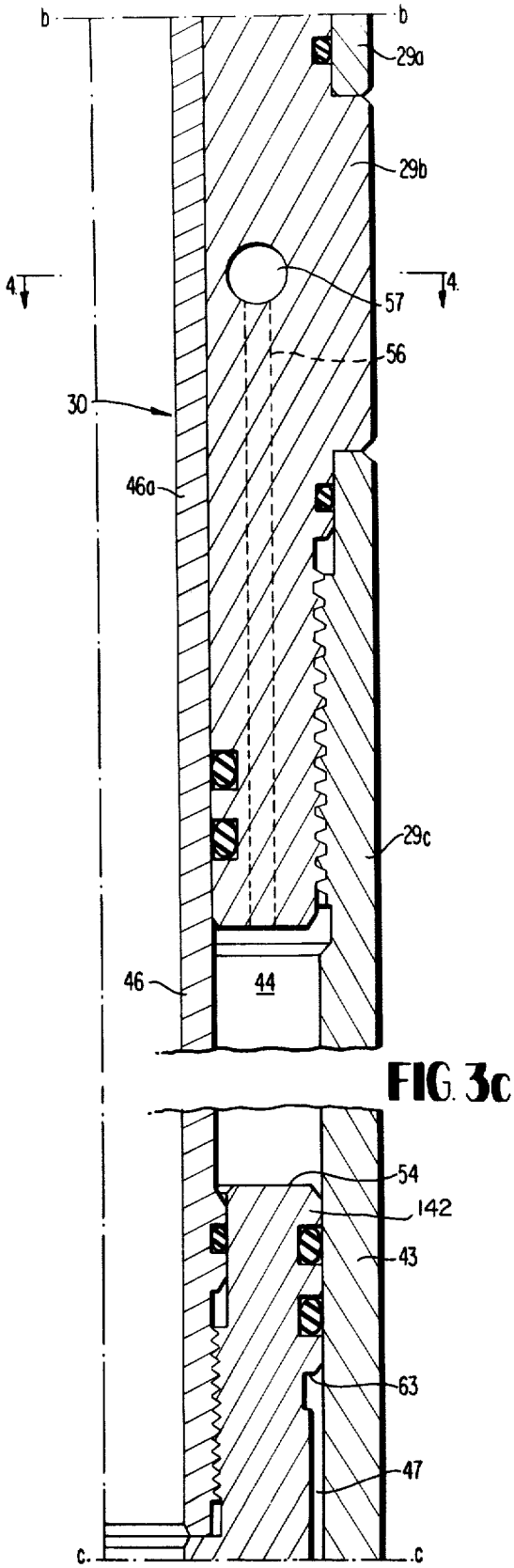
Figure 3D:
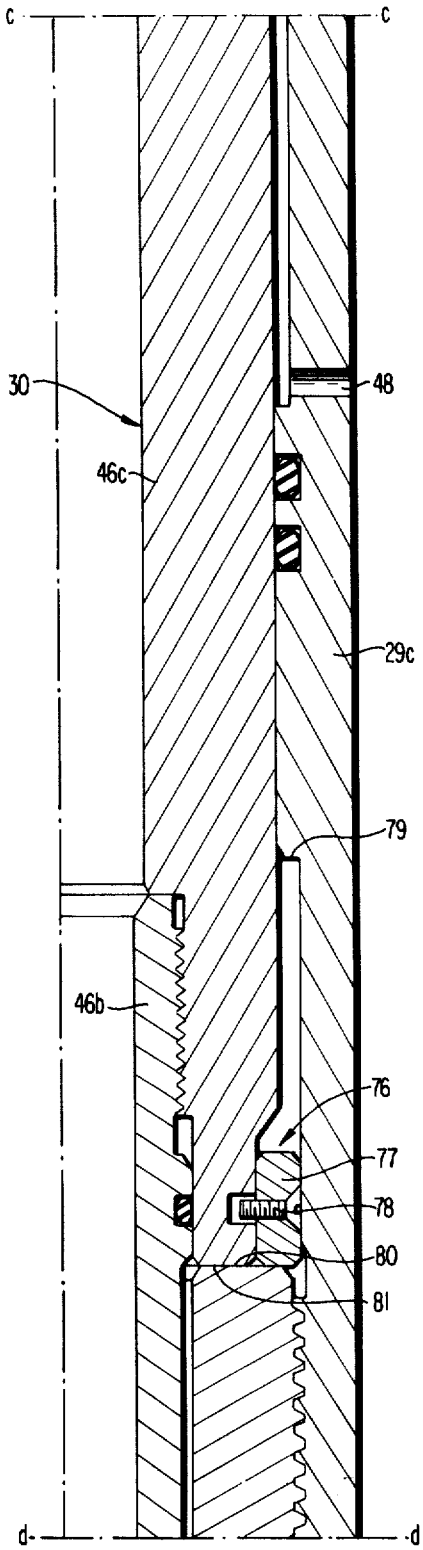
Figure 3G:
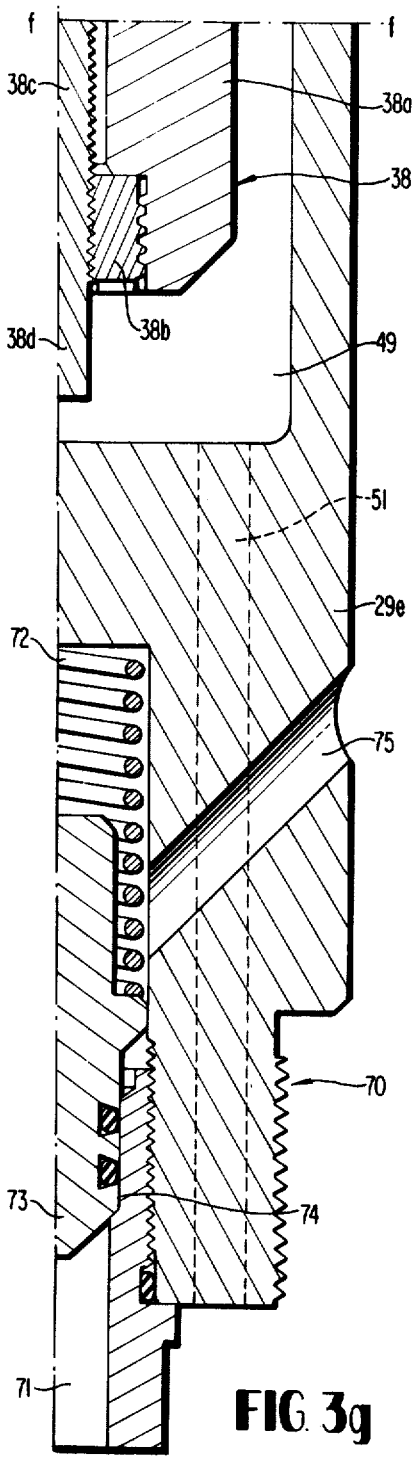
Figure 4:
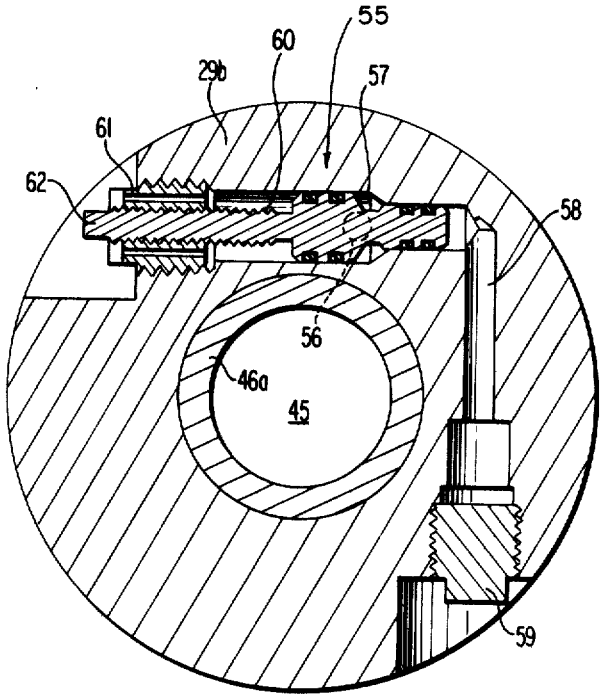
Figure 5:
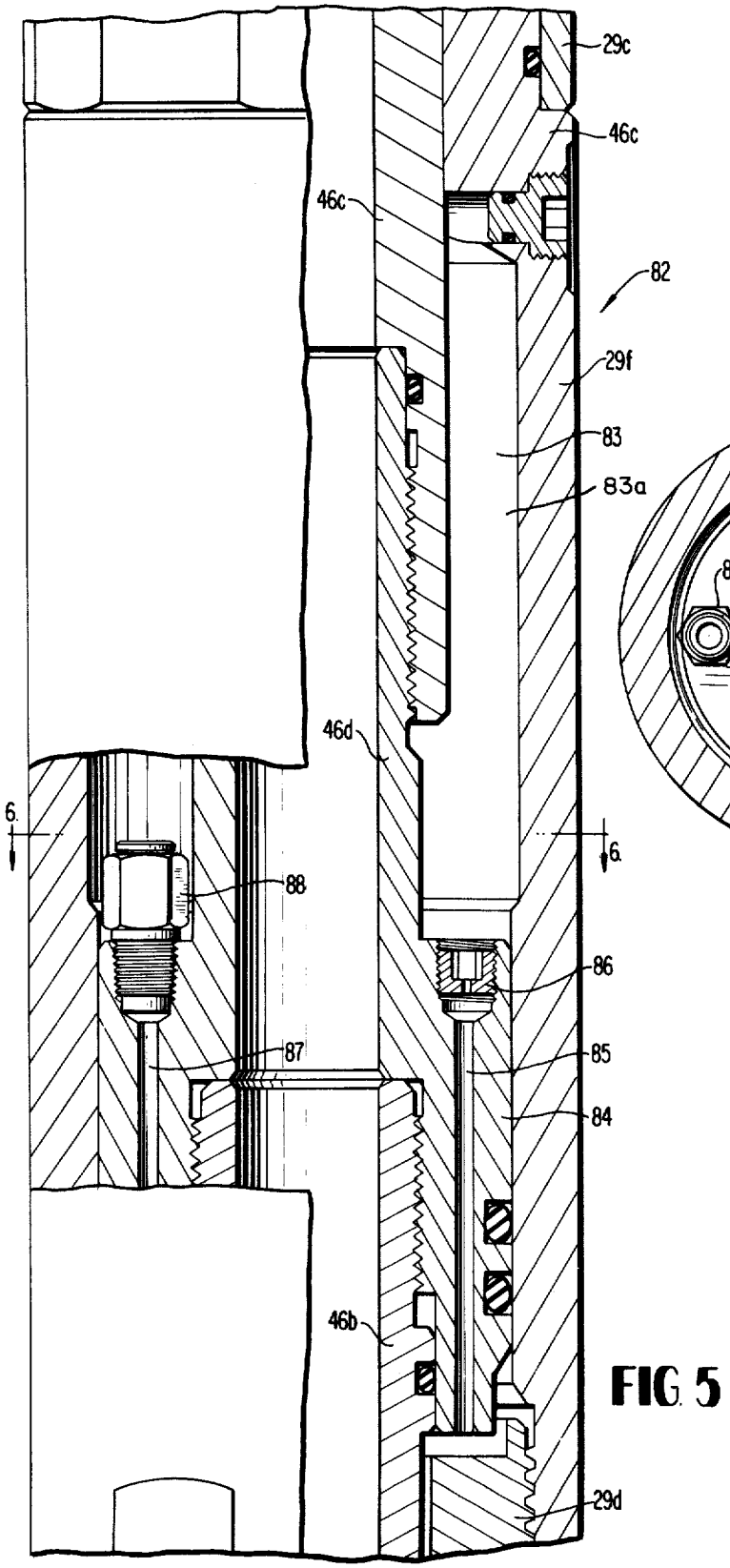
Figure 6:
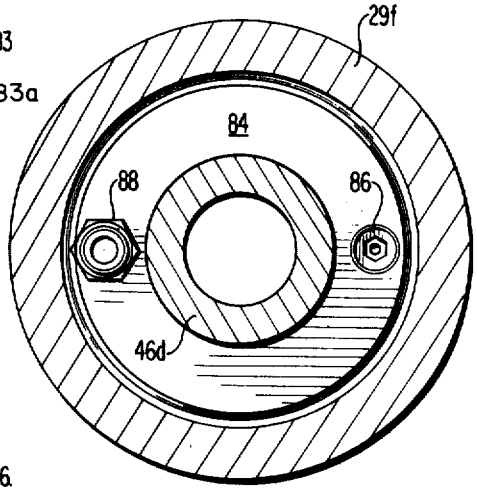

In the drawings:

FIG. 1 provides a schematic, vertical, elevational view of an offshore test site, illustrating a testing string disposed in a submerged well and intersecting a submerged formation whose productivity is to be evaluated;

FIG. 1a provides an enlarged, vertically sectioned, fragmentary, elevational view of a well head portion of the FIG. 1 assembly, located on the floating vessel or work station, and a submerged well head portion, illustrating an annulus pressuring system;

FIG. 2a provides a schematic illustration, vertical cross section, of a valve and sample entrapping mechanism of the present invention, incorporated in the testing string of FIG. 1, and disposed in a flow blocking or closed condition;

FIG. 2b provides a schematic illustration, in vertical cross section, of a valve and sample entrapping mechanism of the present invention, incorporated in the testing string of FIG. 1, and disposed in a flow permitting or open condition;

FIG. 2c provides a schematic illustration, in vertical cross section, of a valve and sample entrapping mechanism of the present invention, incorporated in the testing string of FIG. 1, and disposed in a different, flow preventing or closed position, operable to entrap a sample of formation fluid;

FIGS. 3a through 3g, when joined along the dividing lines a—a through f—f provide an enlarged, vertically sectioned, "right-side only" view of the cylindrical valve and sample entrapping mechanism schematically shown in FIGS. 2a through 2c;

FIG. 4 provides a transverse sectional view of the FIGS. 3a-3g mechanism, illustrating a valve mechanism which facilitates the injection of a body of pressurized nitrogen into a control cavity of the valving and sample entrapping mechanism;

FIG. 5 discloses a modification of the FIGS. 3a-3g mechanism comprising an impedance mechanism which provides optimum control over valving and sample entrapping operations; and FIG. 6 provides a transverse sectional view of the FIG. 5 mechanism, as viewed along the section line 6—6 of FIG. 5.

OVERALL INSTALLATION

FIG. 1 schematically illustrates a representative offshore test operation.

As shown in FIG. 1, a floating drilling vessel or work station 1 is anchored or otherwise secured in position over a submerged well site 2. Submerged well site 2 comprises a bore hole 3, the interior of which may be lined by a casing string 4 in a conventional fashion.

Well bore 3, usually casing 4, intersect a formation 5 whose productivity is to be tested.

Where casing 3 intersects formation 5, at area 3a, [performations] *perforations* will usually be provided to ensure fluid communication between the formation 5 and the interior 6 of the well bore 3.

At the submerged "mud-line" a submerged wellhead installation 7 may be provided. Installation 7 may be provided with a variety of blow-out preventer mechanisms of both the partial closing and "blind" type, the structure and operation of which are generally shown in FIG. 2 of pending U.S. Manes et al. application, Ser. No. 882,856, filed Dec. 8, 1969. This Manes et al disclosure is assigned to the assignee of the present application, and its entire disclosure is herein incorporated by reference.

As will be understood, submerged wellhead 7 may also comprise any of several conventional "off the shelf" submerged wellhead units now available.

A marine conductor 8 extends upwardly from wellhead 7 to floating work station 1 and may be laterally supported on deck means 9 of work station 1, generally as schematically shown in FIG. 1a. The upper end of conductor 8 may pass slidably through a gimbal connection on deck 9. Such an arrangement, known in the art, provides lateral support for conductor 8 while permitting wave action induced, vertical movement of station 1 relative to the conductor. Conductor slip joints might also be used to accommodate wave action.

A testing string 10 is manipulated at work station 1 by conventional hoisting means 11, conventionally operated from a derrick-like structure 12, as shown in FIG. 1. The usual control head, manifold and swivel arrangements may be provided in the upper end of string 10 to permit conventional circulation of fluid through the testing string and rotary testing string manipulations.

This hoisting means, in conjunction with conventional rotary table slip means would be employed to threadably interconnect sections of the test string 10 and lower the test string 10 through the marine [conduction] *conductor* 8 and casing 4 to the general disposition shown in FIG. 1.

As shown in FIG. 1a, test string 10 will be disposed in slidable but sealing engagement with a wellhead seal 12. Wellhead seal 12 may comprise a conventional flow head or circulating head mounted on a wellhead closure 13 and defining a transverse annular barrier extending across the upper end of marine conductor 8. As will thus be appreciated, elements 13 and 12 cooperate to provide a seal between the upper end of marine conductor 18 and the exterior of the conduit or test string 10.

A pressuring fluid supply conduit 14, possibly a conventional, safety valve controlled, mud or "kill" line may extend from site 1, downwardly along the exterior of conductor 8, and intersect the wellhead 7 below its blowout preventors, generally as shown in FIG. 1b. Such a "kill" line would usually be attached to the exterior of conductor 8 and would communicate with the upper interior of casing 4. Conduit 14 extends to a conventional "mud pump" 15 on floating site 1. Pump 15 is used to impart pressure to fluid, possibly of a conventional drilling mud nature, contained within and substantially filling the annular void or space 16 surrounding the conduit string 10, and disposed between the string 10 and casing 4 beneath the well head 7.

String 10 may include the following components, disposed in consecutively downwardly spaced relation:

| Item | Reference Numeral |
|---|---|
| Upper conduit string extending to floating work site 1 (threadably interconnected conduit sections) | 17 |
| Hydraulically operated, conduit string test tree | 18 |
| Intermediate conduit portion | 19 |
| Torque transmitting pressure and volume balanced slip joint | 20 |
| Intermediate conduit portion imparting packer setting weight to lower portion of string | 21 |
| Circulating valve | 22 |
| Intermediate conduit portion | 23 |
| Upper pressure recorder and housing | 24 |
| Valving and sample entrapping mechanism | 25 |
| Lower pressure recorder and housing | 26 |
| Packer mechanism | 27 |
| Perforate "tailpipe" providing fluid communication between interior of conduit string 10 and formation 5 | 28 |

As shown in FIG. 1, with the testing string 10 installed in position, the packer 27 will have been manipulated to expanded condition so as to provide a seal between the conduit string 10 and the bore hole wall 4. Packer 27 may desirably be of the type shown in United States Anderson et al. application, Ser. No. 829,388, filed June 2, 1969, assigned to the assignee of the present application, and the disclosure of which is herein incorporated by reference.

This packer mechanism is operated in response to rotary and linear manipulations of the conduit string as described in the aforesaid Anderson et al application, with sufficient operating weight or movement being transmitted through the string by virtue of the presence of such weight providing elements in the string as the conduit means 21. Such weight is desirable in a testing string of this nature because of the expansible and contractible character of the torque transmitting, but telescoping, slip joint coupling 20. With the weighting elements included in string 10 below coupling 20, downward or upward movement of the conduit string, during its installation, will be effectively transmitted through the string to the operating components of the packer mechanism 27.

After setting of the packer has been initiated, the slip joint 20 will be disposed in a partially contracted condition, the weight of upper elements 17 and 18 of string 10 will be supported by closed blowout preventor rams in wellhead 7, and the drilling vessel 1 will be free to move up and down in relation to the upper end of test string 10. The manner of effecting packer setting as above indicated and the manner in which wellhead rams provide upper test string support by engaging test tree associated abutment means is fully described in the aforesaid Manes et al. application.

During the packer setting, the slip joint 20 effectively isolates wave action induced force from being transmitted through the upper portion of string 10 to the packer 27, as described in the aforesaid Manes et al application. The slip joint 20 also permits some tolerance in the extent of downward movement of the upper conduit string portion, after initiation of packer setter, required to "seat" test tree abutment means on the closed rams in well head 7.

Since the slip joint 20 permits the upper end of the string 10 to be seated on, i.e. supported by, wellhead 7, it permits the string 10 to be disconnected from fully supported relation with the hoisting mechanism of the vessel 1 and thus isolated from wave actions acting on this vessel. Even if string 10 should remain supported by this hoisting mechanism, the telescoping action of the slip joint would prevent the transmission of wave actions to the portion of string 10 below the slip joint.

With the testing string 10 manipulated so as to "seat" or expand the packer 27, the expanded packer will provide a seal between the conduit string 10 and the casing or bore hole wall 4, defining the closed lower end of annular void or space 16. With this arrangement, annular space 16 will be effectively isolated from the interior of the conduit string 10 and from the formation 5. In the embodiment described, the closed rams in wellhead 7, upon which test tree abutment means is seated, will provide an annular closure in wellbore 3, defining a closed upper end of annulus 16. Thus, with annulus 16 filled with fluid, such as mud, line 14 will serve to convey pressurized fluid to annulus 16 and increase its pressure, depending on the height of line 14 and the pressure of fluid it conveys.

Even if the support rams in wellhead 7 should not define an annulus seal at wellhead 7, the annular cavity above wellhead 7 between string 10 and casing 4 will be filled with fluid, possibly mud. This body of fluid will define an upper extension or portion of annulus 16, sealed at its upper end by means 12 and 13.

Indeed, in certain circumstances, it may be desirable for the entire weight of the portion of conduit string 10 above slip joint 20 to be supported by hoist mechanism 11, with slip joint 20 being partially contracted to absorb wave action and the rams of wellhead 7 open. This arrangement would provide an annulus 16 extending from packer 27 to conductor closure 13. Pressurizing of such an elongated annulus 16 could be effected by a pressurizing line 14 communicating with the interior of the conductor 8 at the elevation of the vessel 1.

The test tree mechanism 18 incorporated in the conduit string may comprise the safety mechanism described in the aforesaid Manes et al. application, assigned reference numeral 801 in the Manes et al. application, and commercially available from Otis Engineering Corporation, Post Office Box 34380, Dallas, Tex. 75234 U.S.A. This mechanism 18 comprises an hydraulically operable valve assembly for selectively closing off or opening the interior passage of the string 10 in the vicinity of the submerged wellhead installation 7. The mechanism 18 is designated by Otis Engineering Corporation as a retrievable "subsea test tree," the structure and function of the apparatus being described in greater detail in the aforesaid Manes et al application.

The slip joint mechanism 20 may desirably comprise a pressure and volume balanced slip joint of the type described in U.S. Hyde Pat., No. 3,354,950. The Hyde slip joint comprises an extensible and contractible, telescoping coupling in the conduit string 10, which coupling is pressure and volume balanced, telescoping in nature, and operable to effectively minimize or eliminate the transmission of wave action induced force acting on the upper portion of the conduit string 10 and the floating vessel 1 from being transmitted through the conduit string 10 to the packer 27 and the valving and sample entrapping mechanism 25.

With this basic disposition of components, a valving mechanism included in the device 25 may be operated so as to close the longitudinally extending interior passage of the conduit string 10, open this passage, or close the passage so as to entrap a sample of formation fluid within the body or conduit means portion of the mechanism 25.

As the valving elements of the mechanism 25 are manipulated, the pressure recorders 24 and 26, disposed respectively above and below the mechanism 25, will continuously record the pressure of formation fluid at these sites in the conduit sstring, in a well recognized fashion.

During the testing operation, or during the removal of the testing string, or during its installation, it may be desirable to effect a circulation of fluid between the interior of the conduit string and the annular space 16. Such circulation of fluid is permitted by the circulating valve 22, which normally is disposed in a closed condition. Valve 22 may comprise what is conventionally termed an impact responsive, reverse circulating sub. A valve of this nature conventionally comprises a sleeve valve carried on the interior of the conduit string 10 and operable in response to the dropping of a weight into the interior of the conduit string from the work station 1.

As is often done, from a safety standpoint, the testing string 10 may include a jar mechanism, anticipating the possibility that release of the packer 27 may be impeded for a variety of operational reasons. An effective jarring mechanism which may be utilized for this purpose, and which may be incorporated in the test string above the packer 27, and beneath the recorder 26, comprises an hydraulic jarring mechanism of the type generally features in U.S. Barrington Pat., No. 3,429,389, or of the type featured in U.S. Barrington Pat., No. 3,399,740.

As a further safety feature, the test string 10 may include a "safety joint" incorporated between the jarring mechanism and the packer 27. A safety joint uniquely suitable for such incorporation is featured in U.S. Barrington Pat. No. 3,368,829. The safety joint would permit the testing string to be disconnected from a stuck packer assembly and removed to the work site.

While the arrangements heretofore described afford the unique advantage of an open or unobstructed interior of string 10 extending downwardly from vessel 1 to mechanism 25, it might be desirable, at times, to utilize additional passage blocking, safety equipment. Thus, as described in the aforesaid Manes et al. application, the lower end of the slip joint 20 might be connected with a test string, passage controlling, reciprocation responsive safety valve, designated item 12 in the Manes et al disclosure.

Further, to provide "back-up" control in relation to testing operations, the string 10 might include one or more, additional, valving and sample trapping devices. For example, an hydraulically impeded, tester valve of the type designated item 14 in the aforesaid Manes et al application, and described in U.S. Chisholm et al. Pat., No. 3,358,755, might be incorporated in string 10 immediately above or below mechanism 25. The desired operating position of such an auxiliary tester valve could be controlled and determined by the multiple abutment means, test string supporting arrangement described in the aforesaid Manes et al. application, the entire disclosure of which has been herein incorporated by reference. With such an arrangement, this auxiliary tester valve would be manipulated to an "open" condition, as described in the Manes et al. application, when the mechanism 25 was to control formation testing operations.

Under certain conditions, the packer 27 may not be attached to the test string 10. For example, a drillable test packer could be previously set by a "wire line" and the test string later lowered and coupled with the packer via a probe or "stinger" carried by the test string. Such an arrangement is generally described in U.S. Evans et al. Pat., No. 3,493,052.

With the overall installation and test string having been generally described and various alternatives discussed, it now becomes appropriate to consider the general operating characteristics of this invention as reflecting in the structure and operating characteristics of the valving and sample entrapping mechanism 25.

GENERAL TESTING AND SAMPLE TRAPPING TECHNIQUE

FIGS. 2a, 2b and 2c schematically illustrate manipulations of the sampler mechanism 25 which serve: (1) to permit a controlled flow of fluid from the formation 5 through the interior of the conduit string 10; and (2) to entrap a sample of formation fluid within the body of the mechanism 25.

As shown in FIGS. 2a, 2b and 2c, the mechanism 25 includes a generally tubular body portion or conduit means 29 defining an integral conduit portion of conduit string 10. Body portion 29 is threadably connected at its upper and lower ends to conduit string 10 as illustrated in FIG. 2a.

A slidable generally tubular mandrel means 30, providing a sample chamber side wall, is mounted for telescoping or longitudinal sliding movement within conduit means 29. The lower end of mandrel means 30 is provided with first sleeve valve means 31 including one or more lateral ports 32. The upper end of mandrel means 30 is provided with a second sleeve valve means 33, which sleeve valve means is provided with one or more laterally directed ports 34.

A first, generally tubular valve seat 35 is connected by generally radial wall means 36 to conduit means 29 and is spaced laterally inwardly of conduit means 29. Sample fluid inlet passage means 37, defined by one or more transverse ports, is carried by valve seat 35. A transverse wall or barrier means 38 closes the lower end of lower valve seat 35.

A second or upper tubular valve seat 39 telescopingly receives the second sleeve valve 33. Tubular valve seat 39 is connected by radial wall means 40 to conduit means 29. As shown, valve seat 39 is disposed radially inwardly of conduit means 29.

[A second or upper tubular valve seat 39 telescopingly receives the second sleeve valve 33. Tubular valve seat 39 is connected by radial wall means 40 to conduit means 29. As shown, valve seat 39 is disposed radially inwardly of conduit means 29.]

Outlet passage means 41, defined by one or more transverse or radial ports, is carried by second valve seat means 39. A transverse wall or second barrier means 42 closes the upper end of valve seat 39.

An annular piston [42] *142*, disposed coaxially of conduit means 29 and mandrel means 30, is slidably mounted in a cylinder 43, which cylinder is defined by conduit means 29 and wall means 40 and 36. An upper portion 44 of cylinder means 43 provides a first, expansible and contractible cavity means. This cavity means 44 contains a pressurized body of fluid, in this case contemplated as a pressurized, generally gaseous, body of nitrogen.

The gaseous body of nitrogen in cavity 44 yieldably biases the piston [42] *142* and mandrel 30 downwardly to the closed valve position shown in FIG. 2a. In this position, port means 32 and 34 are displaced, respectively, from port means 37 and 41 so as to prevent a flow of formation fluid through the passage means 37 into a sample chamber 45 or out of chamber 45 via passage means 37. Sample chamber 45 is a cavity defined by a cylindrical wall portion 46 of mandrel 43, barriers 42 and 38, and valve seats 39 and 35.

The expansible and contractible nature of the pressurized nitrogen in cavity 44 biases the piston [42] *142* downwardly, but will permit upward piston movement in response to sufficient pressure acting on the underside of the piston [42] *142*.

A second expansible and contractible cavity means 47, defined by a lower portion of cylinder 43, communicates with the underside of annular piston [42] *142*. One or more transverse or radial ports 48 intersect conduit means 29 so as to provide pressure change transmitting and fluid communicating relation between the annular space 16 and the cavity 47.

It is contemplated that when the pressure of fluid (which may comprise drilling mud) in the annular space 16 is unpressurized, i.e. not subjected to pump pressure, the relatively lower level of hydrostatic pressure of this fluid at the port means 48 will not be sufficient to overcome the bias of nitrogen cavity 44 and raise the piston [42] *142* and mandrel means 30. Thus, under these conditions, shown in FIG. 2a, valve means 31 and 33 will not permit fluid to flow from the formation 5, through the lower interior space 49 of the conduit string 29, the port 37, the sample chamber 45, and sample outlet port means 41, and into the upper interior space 50 of the string 29.

FIG. 2b illustrates the disposition of the mandrel 30 after the pressure in annulus 16 has been substantially raised through operation of the pump 15 at the floating work site 1. By operating the pump 15 so as to increase the pressure of mud in the annulus 16 to a predetermined higher level, sufficient pressure will be generated in the cavity 47 to overcome the nitrogen bias in cavity 44 and move the piston [42] *142* and mandrel 30 upwardly to the FIG. 2b position.

In this position a "flow test" may be conducted since the inlet means 37 now communicates with the sample chamber 45 by way of valve port 32 and the sample chamber outlet means 41 communicates with the upper interior portion 50 of the conduit string 29 by way of upper valve port means 34. This disposition of ports permits formation fluid to flow from the formation 5, through the interior space 49 and sample chamber 45, and into the upper interior portion 50 of the conduit string for a flowing test.

By operating the pump 15 so as to substantially reduce the annulus pressure, the mandrel 30 may be caused to reclose, since the reduced annulus pressure will not be sufficient to overcome the biasing influence of the pressurized nitrogen in the cavity 44.

Thus, by alternately raising and lowering the pressure in the annulus 16, a series of alternating "closed-in" and "flowing" pressure tests may be effected. The last "closed-in" test, with the mandrel 30 in its lower FIG. 2c position, will trap a formation sample in chamber 45.

It is contemplated that a yieldable restraining means subsequently described, will serve to maintain the mandrel 30 in the intermediate, elevated position shown in FIG. 2b in response to a first higher level of increased pressure in the annulus 16.

By imparting a greater or second higher level of pressure to fluid in the annulus 16, sufficient force may be exerted on the piston [42] *142* so as to overcome the effect of the restraining means and cause the mandrel 30 to move to the upper valve closing and sample trapping position shown in FIG. 2c.

With the mandrel means 30 disposed as shown in FIG. 2c, the port means 32 and 34 are displaced respectively from port means 37 and 41 so as to close the sample chamber 45, prevent upward flow from string portion 49 to 50, and effectively isolate or trap a sample of formation fluid in the sample chamber 45.

A latching mechanism, to be subsequently described, will serve to latchingly secure the mandrel means 30 in the upper positions shown in FIG. 2c when the mandrel means has been moved to this position in response to the second or high, elevated pressure level in the annulus 16.

With the formation sample trapped in chamber 45, because mandrel is disposed in either the FIGS. 2a or FIG. 2c position, the conduit string may be retrieved so as to dispose the mechanism 25 at the well site 1. At this time the mechanism 25 may be threadably detached from the conduit string. The sample within the chamber 45 may be removed from the mechanism 25 at the work site 1, or at some other analysis site, for evaluation purposes.

Significantly, the FIG. 2c arrangement insures a fail-safe function. If the nitrogen pressure in cavity 44 should be reduced by leakage, or if the annulus pressure became excessive, the tester valve 25 will automatically close and latch.

DETAILED STRUCTURE OF VALVING AND SAMPLE TRAPPING MECHANISM

With the general structure and mode of operation of the mechanism 25 having been described, it now becomes appropriate to consider structural details of this mechanism with reference to FIGS. 3a—3g, 4, 5 and 6.

As has been previously noted, the string 10 includes tubular conduit means 29. Tubular conduit means 29 may be assembled from a series of longitudinally and threadably interconnected sections 29a, 29b, 29c, 29d and 29e, generally as shown in FIGS. 3a–3g.

Conduit means 29, by way of passage means 49 shown in FIG. 3g, communicates with formation 5. This communication is effected through a generally vertical passage portion 51 formed in lower coupling conduit section 29e, as generally shown in FIG. 3g. Passage means 51 is designed so as to communicate with the interior of other elements of the testing string 10 disposed beneath the mechanism 25, which other interior passages communicate with the formation 5 by way of the apertured tailpipe 28. An arrangement of this type is shown in U.S. Perkins et al. Pat. No. 3,152,644.

When the conduit string 10 is disposed in the well bore for a testing operation, the casing or well bore wall means 4 encircles at least a portion of the conduit means 29. As has been previously noted, the packer 27, when expanded, provides selectively releasable sealing means extending between conduit means 29 and well casing 4. Packer 27 cooperates with the conduit means 29 and the wall means 4 to ensure that the annulus 16 is isolated from the interior of the conduit means 10 and the formation 5.

The first, generally tubular, valve seat 35 is mounted centrically with wall portion 29c by way of coupling portion 29d of conduit means 29 as generally shown in FIGS. 3e and 3f. Coupling portion 29d provides radial wall means 36, as shown in FIG. 3e. With the arrangement of threaded connections shown in FIGS. 3e and 3f, generally tubular valve seat means 35 is coaxially mounted in relation to conduit means 29, and telescopingly receives first, sleeve valve means 31. Sleeve valve means 31 supports valving port means 32, as shown in FIG. 3f.

The second, generally tubular valve seat means 39, is connected to wall means 29 by way of coupling portion 29b. Coupling portion [3b] *29b* provides radial wall means 40 as shown in FIG. 3b. Coupling 29b is threadably connected with valve seat means 39, secures this valve seat means in coaxial relation with conduit means 29, and is disposed above the first valve seat means 35. Valve seat means 39 telescopingly receives sleeve valve means 33 and its valving port means 34, as shown in FIG. 3b.

As will be apparent from FIGS. 3a and 3b, as well as FIGS. 3e and 3f, the slidable, generally tubular, sample chamber side wall means 46, provided by mandrel 30, is telescopingly mounted in the first and second valve seat means 35 and 39, respectively. Wall means 46 includes sleeve valve means 31 and 33.

As has been earlier noted, the first sleeve valve means 31, shown in FIG. 3e, is disposed in valving cooperation with the portion of seat means 35 which carries the transverse sample inlet port means 37.

Similarly, the second sleeve valve means 33 shown in FIG. 3b, is disposed in valving cooperation with the portion of seat means 39 which carries sample outlet port means 41.

As is shown in FIGS. 3b and 3c, upper valve means 33 is defined by a tubular portion 46a of tubular wall means 46, while lower valve means 31 is defined by a tubular portion 46b of sample chamber side wall means 46. Wall means 46a and 46b are threadably interconnected by an intermediate, tubular wall portion 46c, as shown in FIGS. 3c and 3d.

The formation fluid inlet passage means 37, carried by seat means 35, as shown in FIG. 3e, is operable to transmit formation fluid to the interior 45 of the sample chamber side wall means 46 under the valving control of sleeve valve means 31 and its valving port means 32.

The formation fluid outlet passage means 41, shown in FIG. 3b and carried by the first valve seat means 39, is operable to transmit formation fluid from the interior 45 of the slidable sample chamber side wall means 46 to the upper interior space 50 of the conduit string 29. This fluid flow, of course, is under the valving control of the second or upper valve means 33 and its valving port means 34.

The first and second valve means 31 and 33 are concurrently operable or movable in response to axial movement of the wall means 46. These valve means are thus concurrently and sequentially movable from first through second to third positions shown respectively in FIGS. 2a, 2b and 2c.

In the first position, shown in FIG. 2a and in FIGS. 3a–3g, the inlet and outlet passage means 37 and 41 are closed by the valve means 31 and 33, respectively.

In the second or intermediate position shown in FIG. 2b, where the valve means are disposed above the first position, these valve means serve to align the valve port means 32 and 34 with the seat port means 37 and 41, respectively, so as to open the inlet and outlet passage means 37 and 41.

In the third or uppermost position shown in FIG. 2c, the valve means is moved to a position where the port means 32 and 34 are displaced from and disposed above the port means 37 and 41, respectively. This disposition of valve components serves to again close the inlet and outlet passage means 37 and 41, respectively.

A first wall portion 29e of conduit means 29 defines a first valve shielding means. This first means 29e is spaced radially outwardly of the inlet passage means 37 and first valve seat means 35. First valve shielding means 39e cooperates with the valve seat means 35 to define a first annular passage 52 leading to the inlet passage means 37 and communicating with the cavity means 49.

A second wall portion 29a of conduit means 29 provides a second valve shielding means. This second means 29a is spaced outwardly of the outlet passage means 41 and the second valve seat means 39. Valve shielding means 29a cooperates with valve seat means 39 to define a second annular passage 53, leading from the outlet passage means 41 and communicating with the tool string cavity 50.

The barrier means [39] *38*, which closes the lower portion of the first valve seat means 35, is shown in FIG. 3g while the second barrier means 42 which closes the upper portion of the second valve seat means 39 is shown in FIG. 3a. As illustrated in FIGS. 3g and 3a, respectively, barrier means 38 and 42 are threadably connected with, and extend transversely of, the valve seat means 35 and 39, respectively.

The first barrier means 38 is defined by a tubular component 38a threadably secured to the lower end of valve seat 35, a nut or transverse wall portion 38b threadably connected to tubular portion 38a, and a first plug valve means 38c. Plug valve means 38c is readily secured in nut 38b and includes a manipulating end 38d adapted to be rotated by an appropriate hand tool. When plug valve end 38d is appropriately rotated, the plug valve means 38c will move downwardly from the position shown in FIG. 3f so as to open or expose the transverse port 38e formed in tubular barrier portion 38a. The opening of this port, during a sample removal operation, will either facilitate the flow of sample fluid out of the cavity 45 through the port means 38e or may alternatively permit the injection of sample displacing fluid into the cavity 45.

Similarly, the upper barrier means 42 includes a tubular portion 42a threadably connected with the upper end of valve seat 39. A nut or transverse wall portion 42b threadably engages the upper end of tubular wall portion 42a of barrier means 42. A second plug valve 42c is threadably mounted in wall portion 42b for valving movement longitudinally of conduit means 29. Laterally or radially extending port means 42d are provided in tubular wall portion 42a of barrier means 42.

By engaging an upper portion 42e or plug valve means 42e with a manipulating tool, the plug valve 42c may be rotated and moved to an upper position so as to open the port 42d. During a sample removal operation, the open port 42d will serve to permit the removal of sample fluid from the cavity 45 or the injection of sample displacing fluid into this cavity.

The first valve shielding means [49e] *29e* is threadably detachable from conduit means portion 29d so as to provide direct access to manipulating end 38d of the plug valve means 38c when the testing apparatus has been removed to an analysis station.

Similarly, the second shielding means [28a] *29a* is threadably detachable from conduit means portion 29b so as to provide direct manipulating access to end 42e of plug valve 42c at such an analysis station.

The formation testing actuating means of the system includes the pump means 15 which is operable from the floating work site 1. The pressure of fluid, possibly mud, in the annulus 16 is increased above hydrostatic pressure in response to selective operation of the pump 15 at the site 1. Increases, or decreases, of pressure in the fluid in annulus 16 are isolated from the formation 5 as heretofore noted.

The testing actuating means includes the piston [42] *142*, heretofore noted, which piston is shown in detail in FIGS. 3c and 3d. As there shown, piston [42] *142* includes a first, relatively large, upwardly facing, annularly configured, fluid reaction surface 54. Annular surface 54, disposed concentrically within conduit means 29, is carried by piston means [42] *142* and disposed in fluid communicating relation with the first expansible and contractible cavity means 43.

As have been previously noted, cavity means 44 is defined by cylinder means 43 and is occupied, in the preferred embodiment, by pressurized nitrogen gas.

Pressurized nitrogen is introduced into the cavity 44 through a control valve mechanism 55, operable at the floating work station 1, or other assembly site, and is generally shown in FIGS. 3d and 4.

Nitrogen control mechanism comprises a generally longitudinally extending passage 56 extending upwardly from cavity 44 and [comminicating] *communicating* therewith. Passages 56 communicates with a transversely extending passage 57, formed in the wall or body of conduit means component 29b, as generally shown in FIG. 4. Passage 57 intersects and communicates with another transverse passage 58 formed in the body of conduit component 29b, also as shown in FIG. 4. A detachable, threaded plug 59 is operable to close an end of passage portion 58, which end communicates with the exterior of the conduit means 29.

A plug valve 60 is threadably secured in a mounting plug 61, with mounting plug 61 in turn being threadably mounted in the exterior end of passage portion 57, adjacent the conduit means exterior. By manipulating and turning an exposed end 62 of plug valve 60, the plug may be moved to the left, as shown in FIG. 4, so as to uncover the upper end of the passage 56. With the upper end of passage 56 open, and with the plug 59 removed, and with the passage 58 connected with a source of pressurized nitrogen via a conventional fitting engaging the exposed end of passage 58, pressurized nitrogen may be conveyed consecutively through passage means 58, 57 and 56 to the cavity 44. When sufficient nitrogen has been transmitted to cavity 44 to produce a predetermined pressure in this cavity, the plug valve 60 may be reclosed, i.e. manipulated to the position shown in FIG. 4, the nitrogen supply fitting removed, and the plug 59 threadably reinstalled in the exterior end of passage 58.

The pressure of the nitrogen in the cavity 44 will be predetermined, and will be of such a level as to ensure that the piston [42] *142* and mandrel 30 will move upwardly from the closed position shown in FIG. 2a only in response to the pressurizing of fluid in annulus 16, i.e. not in response to mere hydrostatic pressure in the annulus 16. This pressurizing will be effected by pump means 15, under the control of suitable pressure monitoring instruments, at floating vessel 1. The pressurizing will first be effected so as to generate an increment of pressure in annulus 16, exceeding the hydrostatic pressure at the port means 48, and sufficient to overcome the frictional interaction between mandrel means 30 and the components with which it is telescopingly assembled, including the upper and lower valve seats 35 and 39 and the cylinder means 43.

The second expansible and contractible cavity means 47 included in the cylinder means 43 is shown in FIGS. 3c and 3d.

Cavity 47 is formed in portion 29c of conduit means 29 and communicates with annulus fluid, pressure change transmitting, port 48 as shown in FIGS. [3d and 2d] *3c and 3d.*

The lower, annular end of piston means [42] *142* provides a second, downwardly facing, annular, fluid reaction surface means 63. Fluid reaction surface means 63 is relatively small, in relation to the relatively large surface means 54. Surface means 63 is disposed in fluid communicating relation with the second expansible and contractible cavity means 47.

Piston [42] *142* is moved in response to relationships in fluid forces generated within the first and second cavity means 44 and 47, respectively. When the pressure in cavity means 47 acting on surface 63 imparts an upward force to piston [42] *142* exceeding the downward force exerted by the pressure of fluid in cavity 44 acting on surface 54, the piston will be moved in an upward direction, assuming that the net upward force is sufficient to overcome the [firction] *friction* forces and other impedance acting on the mandrel means 30. The differential area effect, resulting from the use of the relatively large reaction surface 54 and relatively small reaction surface 63, minimizes the level of operating pressure required to be maintained in the nitrogen cavity 44 and permits the use of a relatively low pressure biasing system. Such a low pressure system makes the pressurizing of cavity 44 relatively easy and safe.

In an example of the invention, it has been determined that the ratio between the area of surfaces 63 and 54 may effectively be on the order of 2:5, and that the increase in annulus pressure required to move the mandrel from the FIG. 2a closed position to the FIG. 2b open position may be on the order of about a thousand P.S.I.

The pressure of nitrogen within the cavity 44 necessary to provide appropriate valve response is a function of the volume of this cavity, and volume variations in relation to FIGS. 2a and 2b condition, well bore temperature at the well location where mechanism 25 is positioned, surface temperature at work site 1, desired operating pressures in the annulus 16, the hydrostatic pressure of fluid in the annulus, and the relative fluid reaction areas of surfaces 63 and [64] *54.*

Conventional PVT calculations may be employed to determine the pressure of nitrogen in the cavity 44 which should be created at the site 1, or another work stie, prior to installation of the test string 10. In making such computations it will be desirable to first determine the balancing pressure within cavity 44, with the piston [42] *142* in the intermediate or open position shown in FIG. 2b, in the well bore test site, and subjected it to the preselected valve opening pressure in annulus 16. Such balance pressure, theoretically, would enable the annulus valve opening pressure to move the valve means to the FIG. 2b position and then stabilize or hold it.

This balancing pressure may be extrapolated to the pressure which should exist in the cavity 44, when the piston is in the down position shown in FIG. 2a (and FIGS. 3c and 3d), utilizing conventional PVT calculations, and considering the differences in volume of cavity 44 in the "valve open" and "valve closed" positions of piston [42] *142* shown in FIGS. 2b amd 2a, respectively.

The "down hole" nitrogen pressure in cavity 44, determined for the closed valve disposition of piston [42] *142*, as shown in FIG. 2a, may be converted to the nitrogen pressure necessary to be supplied to the cavity 44 at the work site 1 or other installation site, utilizing conventional PVT criteria and the ratio of absolute temperatures existing at the installation site, and in the well bore at the elevation of the mechanism 25.

In pre-pressurizing the chamber 44 in this manner, the pressure of the nitrogen in the cavity 44 will tend to stabilize the elevated mandrel 30 more or less in the open valve position.

While such stabilization tendencies exist, the kinetics of mandrel and valve movement are such that more positive mandrel restraining action is desirable. A mechanism for providing such restraining action will be subsequently described. However, the generally balanced or stabilized condition of mandrel 30 in its open valve position will minimize the force exerted between the mandrel 30 and the restraining mechanism.

In order to secure the mandrel 30 in the third or uppermost position, apparatus 25 includes valve latching means 64, shown in FIG. 3b. Latching means 64 includes a latching groove 65 disposed in annular socket means 66 carried by the coupling portion 29b of apparatus 25, above the slidable sample chamber side wall means portion 46a. Socket 66 is defined by threadably connected members 39, 42a and 67, as shown in FIGS. 3a, and 3b and telescopingly receives element 33. A latching ring 68 carried by the slidable sample chamber side wall means 46 (i.e. by element 33) is operable to releasably contract into latching cooperation with the socket carried groove 65 when the first and second sleeve valve means 31 and 33 are moved to the third, upper position.

After mechanism 25 has been removed to a sample analysis site, and the sample removed, the threaded components of the latching mechanism may be disassembled to disconnect ring 68 from groove 65. This disassembly may be facilitated by a removable ring portion 69, carried at the upper end of valve 33, as shown in FIG. 3b.

Other latching arrangements might be used to secure mandrel 30 in its elevated position, possibly engaging an intermediate or lower mandrel portion.

A venting valve means 70 is included in conduit means 29 below the first valve means 31. Vent valve means 70 is identical to vent valve means shown in U.S. Perkins et al. Pat., No. 3,152,644, and is operable to vent pressurized fluid from the interior of the conduit means 29 to the annulus 16 in response to a decrease in hydrostatic pressure of annulus fluid adjacent the exterior of said conduit means when the string 10 is raised.

Vent valve means, as shown in FIG. 3g, includes a passage 71 in coupling 29e, operable to communicate with the interior of string 10 beneath apparatus 25. A coil spring 72 biases a plug type check valve 73 in the closing, cooperating with a valve seat 74 in passage 71. A transverse passage 75 in coupling 29e permits annulus pressure to act on the top side of plug valve 73. As the tool spring 10 is raised in the bore hole, the biasing effect of high pressure fluid trapped in the string below valve 73 will overcome the combined bias of spring 72 and annulus pressure. This will permit valve 73 to raise, open passage 71, and vent the trapped fluid to the annulus via passage 51.

In order to positively insure accurate positioning of mandrel 30 in the open valve condition of FIG. 2b, apparatus 25 includes a mandrel restraining means 76, shown in FIG. 3d.

Restraining means 76 includes a restraining ring 77 secured to the exterior of mandrel portion 46c by shear pin means 78. A downwardly facing shoulder 79, carried by body [sections] *section* 29c is operable to abuttingly engage the upper end of ring 77 when mandrel 30 has moved upwardly to the FIG. 2b open valve condition.

When annulus pressure is increased to the second elevated stage, as heretofore described, in order to move mandrel 30 to the FIG. 2c condition, the shear pin means 78 will shear or yield, and thus obviate the restraining influence of ring 77 in relation to mandrel 30. Mandrel 30 will thus be freed to move upwardly into latched engagement with socket means 66, via ring 68 and groove 65, with the latched mandrel means 30 being disposed in the upper closed valve condition, entrapping a formation sample.

Restraining means 76 may also be viewed as including abutment means 80, defined by the lower end of element 46c. Abutment means 80 is engageable with shoulder 81, at the upper end of coupling 29d, so as to secure mandrel 30, and its valve means 31 and 33, in the FIG. 2a, lower, closed valve position.

Thus, the yieldable restraining ring 77 is carried by the sample chamber side wall means 46 and is operable to yieldably prevent movement of said first and second sleeve valve means 31 and 33 from the second, intermediate position shown in FIG. 2b to the third upper position shown in FIG. 2c. Overall restraining means 76 is further operable to position the first and second sleeve valve means at the first, lower position shown in FIG. 2a in response to a relatively low pressure level in said well annulus, by operation of abutment 80 and shoulder 81, at the second, intermediate position shown in FIG. 2b, in response to a relatively intermediate pressure level in said well annulus by operation of ring 77 and shoulder 79, and at the third, upper position shown in FIG. 2c in response to a relatively high pressure level in said well annulus.

By way of example, the intermediate pressure level may be provided by pump means 15 increasing annulus pressure on the order of 1,000 PSI. Again by way of example, the high pressure level or second stage pressure increase, may be provided by increasing annulus pressure, above hydrostatic pressure, on the order of 2,000 PSI, i.e. by imposing on the order of another 1,000 PSI pressure increase on the intermediate pressure level.

Because abrupt, upward mandrel movements might produce tool or valve damage, apparatus 25 may be provided with an impedance mechanism or means 82, shown in FIGS. 5 and 6.

This impedance means 82 may include a cylinder like annular cavity 83 formed in an auxiliary body portion 29f threadably connected with, and axially interposed between, conduit body portion 29d and 29c, previously noted.

Mechanism 82 also may include an annular piston 84 telescopingly mounted in cylinder 83 and carried by an auxiliary mandrel section 46d. As shown in FIG. 5, section 46d may be threadably connected with, and interposed axially between mandrel body section 46c and 46b.

FIG. 5 depicts the positions of the impedance means components, when the mandrel 30 is disposed in the FIG. 2a, lower, closed valve condition.

The cavity defined by cylinder 83 will be filled with a liquid such as oil, injected thereinto through a conventional inlet fitting 85. This oil will impede upward movement of piston 84, although such upward movement will be permitted due to the inclusion of a restricted by-pass passage means 85. Restricted flow through passage means 85, as permitted by an orifice fitting 86, will allow oil to be displaced in cylinder 83 from above piston 84 to below this piston, while slowing upward piston and mandrel movement.

The impedance action of orifice fitting 86 will persist until after upward force on piston [42] *142* has sheared ring 77 free of mandrel 30 and moved piston 84 of the impedance mechanism fully into a radially enlarged, upper portion 83a of cylinder 83. With piston 84 fully disposed in this enlarged cylinder zone, oil will be able to by-pass piston 84 around its periphery and permit the terminal, upward movement of mandrel 30 to be generally unimpeded. In essence, enlarged cylinder portion 83a constitutes a disabling means operable to initiate the movement impeding operation of orifice fitting 86, after the sleeve valve means 31 and 33 have started to move from the intermediate, open valve position to the upper, closed valve position. This disabling operation will insure that the terminal upwardly movement of mandrel 30 is sufficiently positive as to induce latching operation of the mandrel latching mechanism.

Downward movement of piston 84, as mandrel 30 moves from the open valve position to the lower, closed valve position is relatively unimpeded. This downward, unimpeded movement results from the inclusion in piston 84 of a second, by-pass passage 87. Upward flow only through passage 87 is permitted by a check valve fitting 88. Thus, during downward movement of piston 84, check valve 88 will open to permit a rapid transfer of oil through the piston body.

FORMATION TESTING AND SAMPLE TRAPPING

The overall installation of test string 10 has been described, as has the structure and mode of operation of mechanism 25. At this point, the overall testing operation will be reviewed.

When tool string 10 is first disposed in the well bore, the pressure of the pressurized nitrogen in cavity 44 imparted to the piston means [42] *142*, urges the slidable sample chamber side wall means 46 downwardly and holds the first and second sleeve valve means 31 and 33 in the first lower position of FIG. 2a. This prevents flow of formation fluid through the sample trapping chamber means 48 from the formations, while maintaining a relatively low pressure level in the well annulus 16.

By operating the pump means 15 at the floating work station 1 to increase the pressure of fluid in the well annulus 16, the relatively intermediate pressure is provided in the well annulus 16. This effects upward movement of the sample chamber side wall means 46 and moves the first and second valve means 31 and 33 from the first, lower position of FIG. 2a to the second, intermediate position of FIG. 2b. Such movement permits a flow of well fluid consecutively through the inlet passage means 37, interior 45 of said sample trapping chamber means, and outlet passage means 41, with well fluid approaching the sample trapping chamber means 45 through the first annular passage 52 and leaving the sample trapping chamber means 45 through the second annular passage 53.

During movement of the first and second valve means 31 and 33 from the first lower position to the second intermediate position, impedance device 86 will operate to impede upward movement of said first and second valve means.

If a "closed in" pressure reading, after a flow test, is desired, the pump means 15 at the floating work station 1 is operated or "shut down" so as to decrease the pressure of fluid in the well annulus 16. This will provide the relatively low pressure in annulus 16 and effect downward movement of the first and second valve means from the second, intermediate position to the first, lower position. This manipulation of the valve means between the lower and intermediate positions may be cyclically repeated, merely by varying annulus pressure.

During the downward movement of said first and second valve means from the second, intermediate position to the first lower position, the check valve 88 opens to permit relatively unimpeded downward movement of the first and second valve means.

When a testing operation is to be concluded by trapping a sample of formation fluid, the pump means 15 at the floating work station may be operated to provide either the low or relatively high pressure level in the well annulus 16. Either condition will move the first and second valve means from the second, intermediate position to a closed valve position. Such movement, normally to the lower closed valve position, will entrap a sample of formation fluid in the sample trapping chamber means 45. The pressure in cavity 44 will tend to secure chamber 45 in this closed condition.

If the first and second valve means should be moved from the second, intermediate position to the third, upper position, the disabling means 83a will operate to substantialy vitiate the movement impeding operation of the impedance orifice 86.

When the valve means 31 and 33 reach the upper position, the valve latching means 64 operates to secure the first and second valve means in their third, upper position, shown in FIG. 3c.

Throughout the testing operation, the test string support afforded by the submerged well head 7 and/or the telescopable slip joint 20 will serve to prevent wave action induced force through string 10 to tester valve mechanism 25.

After the flow testing and sample trapping operations have been concluded, the conduit string 10 may be manipulated as described in the Anderson et al application to release packer 27 from the wall means 4. The conduit means 10 may be raised by hoisting means 11 to the floating work station 1. During this raising, the venting valve means 70 may operate to vent the interior of said conduit means to the well bore interior in response to the resulting reduction in the hydrostatic pressure of fluid in said well bore adjacent the venting valve means.

At an appropriate analysis or disassembly site, the first and second valve shielding means 29a and 29e may be removed from conduit means 29 to provide substantially unobstructed access to the first and second plug valve means 38c and 42c. At least one of the plug valve means may then be conventionally operated to remove formation fluid from formation sample trapping chamber means 45.

SUMMARY OF MAJOR ADVANTAGES AND SCOPE OF INVENTION

A principal advantage of the invention resides in the provision of a tester valve which may be operated without any tester string manipulation.

A collateral advantage resides in the provision of a tester string valve which will automatically close, or remain closed, when annulus pressure is not raised above the hydrostatic level. When such a valve is present in a conduit string which includes a set packer, or a packer which will set if the string parts and drops, the formations below the packer and valve will always be isolated from a wellhead, in the absence of valve opening, annulus pressure.

When the upper portion of the test string is supported by closed blow-out preventor rams in the submerged well head 7, as described in the Manes et al. application, annulus pressure changes are isolated from the interior of conductor 8. This isolation minimizes the application of stress to the conductor 8 and thus minimizes pollution dangers. In addition, the test string supporting action of the wellhead 7 isolates wave action from the tester valve 25 and packer 27.

The interacting yieldable restraining means, impedance means, mandrel latching means, and "balanced" pressurizing of cavity 44 insure positive, reliable and controlled tester valve manipulations, with minimized stress generation.

In view of the normally closed and annulus pressure responsive nature of tester 25, it may be utilized alone, without relying on other, conventional, safety valve devices.

When tester valve 25 is used with the illustrated tester string, the string advantageously includes a full, open passage extending from vessel 1 to the tester valve.

Several variations in test string arrangements have been discussed, by way of example. As will also be apparent, the tester valve 25 might be utilized as a supplemental safety and control valve in other tester strings, possibly of the type described in the aforesaid Chisholm U.S. Pat., No. 3,358,755, or the Mannes et al. application. It will also be appreciated that the configurations, arrangement, size, and motivating aspects of the tester valve 25 might be modified, while attaining at least some of the major advantages of the invention.

Those skilled in the well testing art and familiar with this disclosure might well envision additions, deletions, substitutions or other disclosure modifications which would fall within the scope of the invention as defined by the appended claims.

What is claimed is:

[1. A method of testing a formation intersected by a well bore, said method comprising:

maintaining a pressure in a body of fluid in a well bore, disposed adjacent a conduit means, at one level while maintaining said body of fluid isolated from a submerged formation to be tested and the interior of said conduit means;

in response to said one level of pressure in said body of fluid, maintaining a flow path leading from said formation through said conduit means in said well bore in a closed condition;

changing the pressure of said fluid body while isolating said change in pressure of said fluid body from said formation;

in response to said change in pressure, permitting fluid to flow from said formation through said conduit means;

further changing the pressure of fluid in said fluid body while isolating said further change in pressure from said formation and the interior of said conduit means;

in response to said first change of pressure of said fluid body, entrapping within said conduit means a sample of fluid from said formation.]

[2. A method of testing a submerged formation from an offshore test site, said method comprising:

maintaining pressure in a body of fluid in a submerged well bore, disposed adjacent a conduit means, at a relatively low level while maintaining said body of fluid isolated from a submerged formation to be tested;

in response to said relatively low level of pressure in said body of fluid, maintaining a flow path leading from said formation through said conduit means in said well bore in a closed condition;

increasing the pressure of said fluid body while isolating said increase in pressure of said fluid body from said formation; in response to said increase in pressure, permitting fluid to flow from said formation through said conduit means;

further decreasing the pessure of fluid in said fluid body while isolating said further decrease in pressure from said formation; and in response to said further decrease of pressure of said fluid body, entrapping within said conduit means a sample of fluid from said formation.]

3. A method of testing a submerged formation from an offshore test site, said method comprising:

disposing a test string including tester valve controlled conduit means between a floating vessel and a submerged formation;

maintaining pressure in a body of liquid in a submerged well bore, disposed adjacent said conduit means, at a relatively low level while maintaining said body of liquid isolated [form] *from* a submerged formation to be tested;

in response to said relatively low level of pressure in said body of liquid, maintaining a flow path leading from said formation through said conduit means in said well bore in a closed condition;

increasing the pressure of said liquid body while isolating said increase in pressure of said liquid body from said formation;

in response to said increase in pressure, permitting fluid to flow from said formation through said conduit means;

further [decreasing] *increasing* the pressure of liquid in said liquid body while isolating said further [decrease] *increase* in pressure from said formation;

in response to said further [decrease] *increase* of pressure of said liquid body, entrapping within said conduit means a sample of fluid from said formation;

maintaining a confined body of pressurized gas in said conduit means operable to determine the pressure level in said liquid body operable to permit said liquid to flow from said formation through said conduit means; and maintaining yieldable means in said conduit means operable to determine the pressure level in said liquid body operable to cause said entrapping.

4. A method as described in claim 3 further comprising:

effecting said testing while concurrently substantially preventing wave action induced forces from being transmitted through said test string from said floating work station to said conduit means.

5. A method of testing a formation, intersected by a well bore site, said method comprising:

providing a well testing assembly including:

conduit means communicating with a formation to be tested, with said conduit means being disposed in a well bore and selectively removable therefrom, wall means encircling at least a portion of said conduit means, and selectively releasable sealing means extending between said conduit means and said wall means and cooperating with said conduit means and said wall means to provide a well annulus isolated from the interior of said conduit means;

regulating flow from said formation through said conduit means with an assembly including:

first, valve seat means carried by a wall portion of said conduit means, second, valve seat means carried by another interior wall portion of said conduit means, and spaced longitudinally of and above said first valve seat means, slidable sample chamber side wall means mounted on said first and second valve seat means for sliding movement longitudinally of said conduit means, first valve means carried by a lower portion of said slidable sample chamber side wall means and disposed in valving cooperation with said first valve seat means, second valve means carried by an upper portion of said slidable sample chamber side wall means and disposed in valving cooperation with said second valve seat means, formation fluid inlet passage means operable to transmit formation fluid from said formation to the interior of said slidable sample chamber side wall means under valving control of said first sleeve valve means, formation fluid output passage means operable to transmit formation fluid from the interior of said slidable sample chamber side wall means to the interior of said conduit means under valving control of said second sleeve valve means, said first and second sleeve valve means being concurrently operable in response to movement of said slidable sample chamber side wall means, said first and second sleeve valve means being sequentially movable from a first position closing said inlet and outlet passage means, to a second position opening said inlet and outlet passage means, and to a third position closing said inlet and outlet passage means;

providing a formation sample trapping chamber means including:

wall means cooperating with said first and second valve seat means and said slidable sample chamber side wall means to define a sample receiving cavity;

providing formation testing actuating means including:

pressurizing means selectively operable to increase the pressure of fluid in said well annulus, with said sealing means isolating said well annulus from said formation, piston means carried by said sample chamber side wall means, cylinder means defined by a portion of said conduit means with said piston means being slidably mounted therein, first expansible and contractible cavity means included in said cylinder means and containing a body of expansible and contractible pressurized fluid yieldably biasing said piston means and slidable sample chamber side wall means in one direction, second expansible and contractible cavity means included in said cylinder means operable to receive formation fluid to bias said piston means in another direction opposite to said one direction, communicating means providing pressure-change transmitting fluid communication between said second expansible and contractible cavity means and said well annulus; and testing said formation by:

imparting the pressure of said pressurized fluid to said piston means to urge said slidable sample chamber side walls means in said one direction and hold said first and second sleeve valve means in said first, position to prevent a flow of formation fluid through said sample trapping chamber means from said formation, while maintaining said relatively low pressure level in said well annulus, operating said pressurizing means to increase the pressure of fluid in said well annulus, with said increase in pressure being operable to provide said relatively intermediate pressure in said well annulus and effect movement of said sample chamber side wall means in said opposite direction and move said first and second valve means from said first position to said second position to permit a flow of fluid consecutively through said inlet passage means, interior of said sample trapping chamber means, and outlet passage means, and operating said pressurizing means to provide said relatively high pressure level in said well annulus to cause said first and second valve means to move in said opposite direction from said second position to said third position and entrap a sample of formation fluid in said sample trapping chamber means.

6. A method of testing a formation as described in claim 5, said method further comprising:

providing valve latching means including:

socket means carried by said conduit means above said slidable sample chamber side wall means, and latching means carried by said slidable sample chamber side wall means and operable to releasably latch said sample chamber side wall means in said socket means when said first and second valve means are moved to said third position;

providing venting valve means in said conduit means below said first valve means and operable to vent pressurized fluid from the interior of said conduit means to the exterior thereof in response to a decrease in pressure of fluid adjacent the exterior of said conduit means;

providing yieldable restraining means carried by said sample chamber side wall means, said restraining means being operable to yieldably prevent movement of said first and second sleeve valve means from said second position to said said third position, said restraining means being further operable to position said first and second sleeve valve means at said first position in response to a relatively low pressure level in said well annulus, at said second position in response to a relatively intermediate pressure level in said well annulus, and at said third position in response to a relatively high pressure level in said well annulus;

providing yieldable movement impedance means operable to yieldably impede initial upward movement of said piston means in said cylinder means and permit relatively unimpeded downward movement of said piston means in said cylinder means, operating said impedance means during said movement of said first and second valve means from said first position to said second position to impede movement of said first and second valve means, operating said pressurizing means to decrease the pressure of fluid in said well annulus and provide said relatively low pressure therein and effect movement of said first and second valve means in said one direction from said second position to said first position, operating said impedance means during said movement of said first and second valve means from said second position to said first position to permit relatively unimpeded downward movement of said first and second valve means, operating said valve latching means to secure said first and second valve means in said third position; and after said testing of said formation, releasing said sealing means from said wall means and permitting said venting valve means to vent the interior of said conduit means to the well bore interior in response to raising of said conduit means upwardly through said well bore and a reduction in the hydrostatic pressure of fluid in said well bore adjacent said venting valve means.

7. A method of testing a submerged formation from an offshore test site, said method comprising:

providing a well testing assembly including:

tubular conduit means communicating with a formation to be tested with said conduit means being disposed in a well bore and selectively removable therefrom to a floating work station, wall means encircling at least a portion of said conduit means, and selectively releasable sealing means extending between said conduit means and said wall means and cooperating with said conduit means and said wall means to provide a well annulus isolated from the interior of said conduit means;

regulating flow from said formation through said conduit means with an assembly including:

first, generally tubular valve seat means carried by and spaced inwardly from an interior wall portion of said conduit means and mounted concentrically therewith, second, generally tubular valve seat means carried by and spaced inwardly from another interior wall portion of said conduit means, mounted concentrically therewith, and spaced longitudinally of and above said first valve seat means, slidable sample chamber side wall means mounted on said first and second valve seat means for sliding movement longitudinally of said conduit means, first sleeve valve means carried by a lower portion of said slidable sample chamber side wall means and disposed in valving cooperating with said first valve seat means, second sleeve valve means carried by an upper portion of said slidable sample chamber side wall means and disposed in valving cooperation with said second valve seat means, formation fluid inlet passage means carried by said first valve seat means, and operable to transmit formation fluid from said formation to the interior of said slidable sample chamber side wall means under valving control of said first sleeve valve means, formation fluid outlet passage means carried by said first valve seat means, and operable to transmit formation fluid from the interior of said slidable sample chamber side wall means to the interior of said conduit means under valving control of said second sleeve valve means, said first and second sleeve valve means being concurrently operable in response to movement of said slidable sample chamber side wall means, said first and second sleeve valve means being sequentially movable from a first, lower position closing said inlet and outlet passage means, to a second, intermediate position above said first position opening said inlet and outlet passage means, and to a third, upper position above said second position closing said inlet and outlet passage means;

providing a formation sample trapping chamber means including:

first barrier means closing a lower portion of said first valve seat means, second barrier means closing an upper portion of said second valve seat means, said first and second barrier means cooperating with said first and second valve seat means to provide sample entrapping closures at upper and lower ends, respectively, of said slidable sample chamber side wall means;

*providing yieldable restraining means carried by said sample chamber side wall means, said restraining means being operable to yieldably prevent movement of said first and second sleeve valve means from said second position to said third position,* providing formation testing actuating means including:

pump means selectively operable from said floating work station to increase the pressure of fluid in said well annulus, with said sealing means isolating said well annulus from said formation, annular piston means carried on the exterior of said sample chamber side wall means and mounted coaxially thereof, cylinder means defined by a portion of said conduit means with said piston means being slidably mounted therein, first expansible and contractible cavity means included in said cylinder means above said piston means and containing a body of expansible and contractible pressurized fluid yieldably biasing said piston means and slidable sample chamber side wall means downwardly, second expansible and contractible cavity means included in said cylinder means below said piston means, communicating means provide pressure-change transmitting fluid communication between said second expansible and contractible cavity means and said well annulus;

testing said formation by:

imparting the pressure of said pressurized fluid to said piston means to urge said slidable sample chamber side wall means downwardly and hold said first and second sleeve valve means in said first, lower position to prevent a flow of formation fluid through said sample trapping chamber means from said formation, while maintaining [said] *a* relatively low pressure level in said well annulus, operating said pump means at said floating work station to increase the pressure of fluid in said well annulus, with said increase in pressure being operable to provide [said] *a* relatively intermediate pressure in said well annulus and effect upward movement of said sample chamber side wall means and move said first and second valve means from said first lower position to said second, intermediate position to permit a flow of fluid consecutively through said inlet passage means, interior of said sample trapping chamber means, and outlet passage means, operating said pump means at said floating work station to provide [said] *a* relatively high pressure level in said well annulus to cause said restraining means to yield, and move said first and second valve means from said second intermediate position to said third, upper position and entrap a sample of formation fluid in said sample trapping chamber means, after said testing of said formation, releasing said sealing means from said wall means, and raising said conduit means to said floating work station; and effecting said testing while concurrently substantially preventing wave action induced forces from being transmitted from said floating work station to said conduit means.

8. A method of testing a submerged formation from an offshore test site, said method comprising:

providing a well testing assembly including:

tubular conduit means communicating with a formation to be tested with said conduit means being disposed in a well bore and selectively removable therefrom to a floating work station, wall means encircling at least a portion of said conduit means, and selectively releasable sealing means extending between said conduit means and said wall means and cooperating with said conduit means and said wall means to provide a well annulus isolated from the interior of said conduit means;

regulating flow from said formation through said conduit means with an assembly including:

first, generally tubular valve seat means carried by and spaced inwardly from an interior wall portion of said conduit means and mounted concentrically therewith, second, generally tubular valve seat means carried by and spaced inwardly from another interior wall portion of said conduit means, mounted concentrically therewith, and spaced longitudinally of and above said first valve seat means, slidable sample chamber side wall means mounted on said first and second valve seat means for sliding movement longitudinally of said conduit means, first sleeve valve means carried by a lower portion of said slidable sample chamber side wall means and disposed in valving cooperation with said first valve seat means, second sleeve valve means carried by an upper portion of said slidable sample chamber side wall means and disposed in valving cooperation with said second valve seat means, formation fluid inlet passage means carried by said first valve seat means, and operable to transmit formation fluid from said formation to the interior of said slidable sample chamber side wall means under valving control of said first sleeve valve means, formation fluid outlet passage means carried by said first valve seat means, and operable to transmit formation fluid from the interior of said slidable sample chamber side wall means to the interior of said conduit means under valving control of said second sleeve valve means, said first and second sleeve valve means being concurrently operable in response to movement of said slidable sample chamber side wall means, said first and second sleeve valve means being sequentially movable from a first, lower position closing said inlet and outlet passage means, to a second, intermediate position above said first position opening said inlet and outlet passage means, and to a third, upper position above said second position closing said inlet and outlet passage means, first valve shielding means defined by a first wall portion of said conduit means, spaced outwardly of said inlet passage means and first valve seat means, and cooperating with said first valve seat means to define a first annular passage leading to said inlet passage means, second valve shielding means defined by a second wall portion of said conduit means, spaced outwardly of said outlet passage means and second valve seat means and cooperating with said second valve seat means to define a second annular passage leading from said outlet passage means;

providing a formation sample trapping chamber means including:

first barrier means closing a lower portion of said first valve seat means, second barrier means closing an upper portion of said second valve seat means, said first and second barrier means cooperating with said first and second valve seat means to provide sample entrapping closures at upper and lower ends, respectively, of said slidable sample chamber side wall means, first, passage means carried by said first barrier means and disposed axially thereof, first plug valve means valvingly mounted in said first passage means, second, passage means carried by said second barrier means and disposed axially thereof and second plug valve means valvingly mounted in said second passage means, said first valve shielding means being removable from said conduit means to provide access to said first plug valve means, and said second valve shielding means being removable from said conduit means to provide access to said second plug valve means;

providing formation testing actuating means including:

pump means selectively operable from said floating work station to increase the pressure of fluid in said well annulus, with said sealing means isolating said well annulus from said formation, annular piston means carried on the exterior of said sample chamber side wall means and mounted coaxially thereof, cylinder means defined by a portion of said conduit means with said piston means being slidably mounted therein, first expansible and contractible cavity means included in said cylinder means above said piston means and containing a body of expansible and contractible pressurized nitrogen yieldably biasing said piston means and slidable sample chamber side wall means downwardly, second expansible and contractible cavity means included in said cylinder means below said piston means, communicating means provide pressure-change transmitting fluid communication between said second expansible and contractible cavity means and said well annulus;

providing valve latching means including:

first latching means carried by said sample trapping chamber means, and second latching means carried by said slidable sample chamber side wall means and operable to engage said first latching means and latch said sample chamber side wall means with said sample trapping chamber means and secure said first and second sleeve valve means in said third, upper position;

providing venting valve means in said conduit means below said first valve means and operable to vent pressurized fluid from the interior of said conduit means to the exterior thereof in response to a decrease in pressure of fluid adjacent the exterior of said conduit means;

providing yieldable restraining means carried by said sample chamber side wall means, said restraining means being operable to yieldably prevent movement of said first and second sleeve valve means from said second, intermediate position to said third upper position, said restraining means being further operable to position said first and second sleeve valve means at said first, lower position in response to a relatively low pressure level in said well annulus, at said second, intermediate position in response to a relatively intermediate pressure level in said well annulus, and at said third, upper position in response to a relatively high pressure level in said well annulus;

providing yieldable movement impedance means operable to relatively impede initial upward movement of said piston means in said cylinder means and permit relatively unimpeded downward movement of said piston means in said cylinder means, said impedance means including disabling means operable to substantially vitiate the movement impeding operation of said impedance means after said yieldable restraining means has yielded to permit said first and second sleeve valve means to move from said second, intermediate position toward said third, upper position;

supporting said conduit means at said floating work station while providing:

collapsible and extensible coupling means between said conduit means and said floating work station; and testing said formation by:

imparting the pressure of said pressurized nitrogen to said piston means to urge said slidable sample chamber side wall means downwardly and hold said first and second sleeve valve means in said first, lower position to prevent a flow of formation fluid through said sample trapping chamber means from said formation, while maintaining said relatively low pressure level in said well annulus, operating said pump means at said floating work station to increase the pressure of fluid in said well annulus, with said increase in pressure being operable to provide said relatively intermediate pressure in said well annulus and effect upward movement of said sample chamber side wall means and move said first and second valve means from said first lower position to said second, intermediate position to permit a flow of fluid consecutively through said inlet passage means, interior of said sample trapping chamber means, and outlet passage means, with said fluid approaching said sample trapping chamber means through said first annular passage and leaving said sample trapping chamber means through said second annular passage, operating said impedance means during said movement of said first and second valve means from said first lower position to said second intermediate position to impede movement of said first and second valve means, operating said pump means at said floating work station to decrease the pressure of fluid in said well annulus and provide said relatively low pressure therein and effect downward movement of said first and second valve means from said second, intermediate position to said first, lower position, operating said impedance means during said downward movement of said first and second valve means from said second, intermediate position to said first lower position to permit relatively unimpeded downward moement of said first and second valve means, operating said pump means at said floating work station to provide said relatively high pressure level in said well annulus to cause said restraining means to yield, and move said first and second valve means from said second intermediate position to said third, upper position and entrap a sample of formation fluid in said sample trapping chamber means, operating said disabling means during said movement of said first and second valve means from said second, intermediate position to said third, upper position to substantially vitiate the movement impeding operation of said impedance means, operating said valve latching means to secure said first and second valve means in said third, upper position;

after said testing of said formation, releasing said seating means from said wall means, raising said conduit means to said floating work station, and permitting said venting valve means to vent the interior of said conduit means to the well bore interior in response to the raising of said conduit means upwardly through said well bore and a reduction in the hydrostatic pressure of fluid in said well bore adjacent said venting valve means;

removing said first and second valve shielding means from said conduit means to provide substantially unobstructed access to said first and second plug valve means; and operating at least one of said first and second plug valve means to remove formation fluid from said formation sample trapping chamber means.

9. A method as described in claim 8 further comprising:

providing first relatively large, fluid reaction surface means carried by said annular piston means and disposed in fluid communicating relation with said expansible and contractible cavity providing second relatively small, fluid reaction surface means carried by said annular piston means and disposed in fluid communicating relation with said second expansible and contractible cavity means;

inducing movement of said annular piston means in response to fluid forces generated within said first and second cavity means.

10. A method as described in claim 9 further comprising:

effecting said testing while concurrently, substantially preventing wave action induced forces from being transmitted from said floating work station to said conduit means.

[11. Apparatus for testing a formation intersected by a well bore, said apparatus comprising:

means for maintaining pressure in a body of fluid in a well bore, disposed adjacent a conduit means, at one level while maintaining said body of fluid isolated from a submerged formation to be tested and the interior of said conduit means;

means operable in response to said one level of pressure in said body of fluid, to maintain a flow path leading from said formation through said conduit means in said well bore in a closed condition;

means for changing the pressure of said fluid body while isolating said change in pressure of said fluid body from said formation;

means operable in response to said change in pressure, to permit fluid to flow from said formation through said conduit means;

means for further changing the pressure of fluid in said fluid body while isolating said further change in pressure from said formation and the interior of said conduit means; and means operable in response to said further change of pressure of said fluid body, to entrap within said conduit means a sample of fluid from said formation.]

[12. Apparatus for testing a submerged formation from an comprising: test site, said apparatus comprising:

means for maintaining pressure in a body of fluid in a submerged well bore, disposed adjacent a conduit means, at a relatively low level while maintaining said body of fluid isolated from a submerged formation to be tested;

means operable in response to said relatively low level of pressure in said body of fluid, to maintain a flow path leading from said formation through said conduit means in said well bore in a closed condition;

means for increasing the pressure of said fluid body while isolating said increase in pressure of said fluid body from said formation;

means operable in response to said increase in pressure to permit fluid to flow from said formation through said conduit means;

means for further decreasing the pressure of fluid in said fluid body while isolating said further decrease in pressure from said formation; and means operable in response to said further decrease of pressure of said fluid body, to entrap within said conduit means a sample of fluid from said formation.]

13. Apparatus for testing a submerged formation from an offshore test site, said apparatus comprising:

means for disposing a test string including tester valve controlled conduit means between a floating vessel and a submerged formation;

means for maintaining pressure in a body of liquid in a submerged well bore, disposed adjacent said conduit means, at a relatively low level while maintaining said body of liquid isolated from a submerged formation to be tested;

means operable in response to said relatively low level of pressure in said body of [liquie] *liquid*, to maintain a flow path leading from said formation through said conduit means in said well bore is a closed condition;

means for increasing the pressure of said liquid body while isolating said increase in pressure of said liquid body from said formation;

means operable in response to said increase in pressure, to permit fluid to flow from said formation through said conduit means;

means for further [decreasing] *increasing* the pressure of liquid in said liquid body while isolating said further [decrease] *increase* in pressure from said formation;

means operable in response to said further [decrease] *increase* of pressure of said liquid body, to entrap within said conduit means of sample of fluid from said formation;

means providing and maintaining a confined body of pressurized gas in said conduit means, with said body being operable to determine the pressure level in said liquid body operable to permit said liquid to flow from said formation through said conduit means;

yieldable means in said conduit means operable to determine the pressure level in said liquid body operable to cause said entrapping.

14. Apparatus as described in claim 13 further comprising:

means for effecting said testing while concurrently substantially preventing wave action induced forces from being transmitted through said test string form said floating work station to said conduit means.

15. Apparatus for testing a formation, intersected by a well bore site, said apparatus comprising:

a well testing assembly including conduit means communicating with a formation to be tested, with said conduit means being disposed in a well bore and selectively removable therefrom, wall means encircling at least a portion of said conduit means, and selectively releasable sealing means extending between said conduit means and said wall means and cooperating with said conduit means and said wall means to provide a well annulus isolated from the interior of said conduit means;

means for regulating flow from said formation through said conduit means and including first, valve seat means carried by a wall portion of said conduit means, second, valve seat means carried by another interior wall portion of said conduit means, and spaced longitudinally of and above said first valve seat means, slidable sample chamber side wall means mounted on said first and second valve seat means for sliding movement longitudinally of said conduit means, first valve means carried by a lower portion of said slidable sample chamber side wall means and disposed in valving cooperation with said first valve seat means, second valve means carried by an upper portion of said slidable sample chamber side wall means and disposed in valving cooperation with said second valve seat means, formation fluid inlet passage means operable to transmit formation fluid from said formation to the interior of said slidable sample chamber side wall means under valving control of said first sleeve valve means, formation fluid outlet passage means operable to transmit formation fluid from the interior of said slidable sample chamber side wall means to the interior of said conduit means under valving control of said second sleeve valve means, said first and second sleeve valve means being concurrently operable in response to movement of said slidable sample chamber side wall means, said first and second sleeve valve means being sequentially movable from a first position closing said inlet and outlet passage means, to a second position opening said inlet and outlet passage means, and to a third position closing said inlet and outlet passage means;

a formation sample trapping chamber means including:

wall means cooperating with said first and second valve seat means and said slidable sample chamber side wall means to define a sample receiving cavity; and formation testing actuating means including pressurizing means selectively operable to increase the pressure of fluid in said well annulus, with said sealing means isolating said well annulus from said formation, piston means carried by said sample chamber side wall means, cylinder means defined by a portion of said conduit means with said piston means being slidably mounted therein, first expansible and contractible cavity means included in said cylinder means and containing a body of expansible and contractible pressurized fluid yieldably biasing said piston means and slidable sample chamber side wall means in one direction, second expansible and contractible cavity means included in said cylinder means operable to receive formation fluid to bias said piston means in another direction opposite to said one direction, communicating means providing pressure-change transmitting fluid communication between said second expansible and contractible cavity means and said well annulus.

16. Apparatus for testing a formation as described in claim 15, said apparatus further comprising:

valve latching means including:

socket means carried by said conduit means above said slidable sample chamber side wall means, and latching means carried by said slidable sample chamber side wall means and operable to releasably latch said sample chamber side wall means in said socket means when said first and second valve means are moved to said third position;

venting valve means in said conduit means below said first valve means and operable to vent pressurized fluid from the interior of said conduit means to the exterior thereof in response to a decrease in pressure of fluid adjacent the exterior of said conduit means;

yieldable restraining means carried by said sample chamber side wall means, said restraining means being operable to yieldably prevent movement of said first and second sleeve valve means from said second position to said third position, said restraining means being further operable to position said first and second sleeve valve means at said first position in response to a relatively low pressure level in said well annulus, at said second position in response to a relatively intermediate pressure level in said well annulus, and at said third position in response to a relatively high pressure level in said well annulus; and yieldable movement impedance means operable to yieldably impede initial upward movement of said piston means in said cylinder means and permit relatively unimpeded downward movement of said piston means in said cylinder means.

17. Apparatus for testing a submerged formation from an offshore test site, said apparatus comprising:

a well testing assembly including tubular conduit means communicating with a formation to be tested with said conduit means being disposed in a well bore and selectively removable therefrom to a floating work station, wall means encircling at least a portion of said conduit means, and selectively releasable sealing means extending between said conduit means and said wall means and cooperating with said conduit means and said wall means to provide a well annulus isolated from the interior of said conduit means;

means for regulating flow from said formation through said conduit means and including first, generally tubular valve seat means carried by and spaced inwardly from an interior wall portion of said conduit means and mounted concentrically therewith, second, generally tubular valve seat means carried by and spaced inwardly from another interior wall portion of said conduit means, mounted concentrically therewith, and spaced longitudinally of and above said first valve seat means, slidable sample chamber side wall means mounted on said first and second valve seat means for sliding movement longitudinally of said conduit means, first sleeve valve means carried by a lower portion of said slidable sample chamber side wall means and disposed in valving [cooperating] *cooperation* with said first valve seat means, second sleeve valve means carried by an upper portion of said slidable sample chamber side wall means and disposed in valving cooperating with said second valve seat means, formation fluid inlet passage means carried by said first valve seat means, and operable to transmit formation fluid from said formation to the interior of said slidable sample chamber side wall means under valving control of said first sleeve valve means, formation fluid outlet passage means carried by said first valve seat means, and operable to transmit formation fluid from the interior of said slidable sample chamber side wall means to the interior of said conduit means under valving control of said second sleeve valve means, said first and second sleeve valve means being concurrently operable in response to movement of said slidable sample chamber side wall means, said first and second sleeve valve means being sequentially movable from a first, lower position closing said inlet and outlet passage means, to a second, intermediate position above said first position opening said inlet and outlet passage means, and to a third, upper position above said second position closing said inlet and outlet passage means;

a formation sample trapping chamber means including first barrier means closing a lower portion of said first valve seat means, second barrier means closing an upper portion of said second valve seat means, said first and second barrier means cooperating with said first and second valve seat means to provide sample entrapping closures at upper and lower ends, respectively, of said slidable sample chamber side wall means; and formation testing actuating means including pump means selectively operable from said floating work station to increase the pressure of fluid in said well annulus, with said sealing means isolating said well annulus from said formation, annular piston means carried on the exterior of said sample chamber side wall means and mounted coaxially thereof, cylinder means defined by a portion of said conduit means with said piston means being slidably mounted therein, first expansible and contractible cavity means included in said cylinder means above said piston means and containing a body of expansible and contractible pressurized fluid yieldably biasing said piston means and slidable sample chamber side wall means downwardly, second expansible and contractible cavity means included in said cylinder means below said piston means, and communicating means provide pressure-change transmitting fluid communication between said second expansible and contractible cavity means and said well annulus.

18. Apparatus for testing a submerged formation from an offshore test site, said apparatus comprising:

a well testing assembly including tubular conduit means communicating with a formation to be tested with said conduit means being disposed in a well bore and selectively removable therefrom to a floating work station, wall means encircling at least a portion of said conduit means, and selectively releasable sealing means extending between said conduit means and said wall means and cooperating with said conduit means and said wall means to provide a well annulus isolated from the interior of said conduit means;

means for regulating flow from said formation through said conduit means and including first, generally tubular valve seat means carried by and spaced inwardly from an interior wall portion of said conduit means and mounted concentrically therewith, second, generally tubular valve seat means carried by and spaced inwardly from another interior wall portion of said conduit means, mounted concentrically therewith, and spaced longitudinally of and above said first valve seat means, slidable sample chamber side wall means mounted on said first and second valve seat means for sliding movement longitudinally of said conduit means, first sleeve valve means carried by a lower portion of said slidable sample chamber side wall means and disposed in valving cooperation with said first valve seat means, second sleeve valve means carried by an upper portion of said slidable sample chamber side wall means and disposed in valving cooperation with said second valve seat means, formation fluid inlet passage means carried by said first valve seat means, and operable to transmit formation fluid from said formation to the interior of said slidable sample chamber side wall means under valving control of said first sleeve valve means, formation fluid outlet passage means carried by said first valve seat means, and operable to transmit formation fluid from the interior of said slidable sample chamber side wall means to the interior of said conduit means under valving control of said second sleeve valve means, said first and second sleeve valve means being concurrently operable in response to movement of said slidable sample chamber side wall means, said first and second sleeve valve means being sequentially movable from a first, lower position closing said inlet and outlet passage means, to a second, intermediate position above said first position opening said inlet and outlet passage means, and to a third, upper position above said second position closing said inlet and outlet passage means, first valve shielding means defined by a first wall portion of said conduit means, spaced outwardly of said inlet passage means and first valve seat means, and cooperating with said first valve seat means to define a first annular passage leading to said inlet passage means, second valve shielding means defined by a second wall portion of said conduit means, spaced outwardly of said outlet passage means and second valve seat means and cooperating with said second valve seat means to define a second annular passage leading from said outlet passage means;

a formation sample trapping chamber means including first barrier means closing a lower portion of said first valve seat means, second barrier means closing an upper portion of said second valve seat means, said first and second barrier means cooperating with said first and second valve seat means to provide sample entrapping closures at upper and lower ends, respectively, of said slidable sample chamber side wall means, first, passage means carried by said first barrier means and disposed axially thereof, first plug valve means valvingly mounted in said first passage means, second, passage means carried by said second barrier means and disposed axially thereof, and second plug valve means valvingly mounted in said second passage means, said first valve shielding means being removable from said conduit means to provide access to said first plug valve means, and said second valve shielding means being removable from said conduit means to provide access to said second plug valve means;

formation testing actuating means including pump means selectively operable from said floating work station to increase the pressure of fluid in said well annulus, with said sealing means isolating said well annulus from said formation, annular piston means carried on the exterior of said sample chamber side wall means and mounted coaxially thereof, cylinder means defined by a portion of said conduit means with said piston means being slidably mounted therein, first expansible and contractible cavity means included in said cylinder means above said piston means and containing a body of expansible and contractible pressurized nitrogen yieldably biasing said piston means and slidable sample chamber side wall means downwardly, second expansible and contractible cavity means included in said cylinder means below said piston means, communicating means provide pressure-change transmitting fluid communication between said second expansible and contractible cavity means and said well annulus;

valve latching means including first latching means carried by said sample trapping chamber means, and second latching means carried by said slidable sample chamber side wall means and operable to engage said first latching means and latch said sample chamber side wall means with said sample trapping chamber means and secure said first and second sleeve valve means in said third, upper position;

venting valve means in said conduit means below said first valve means and operable to vent pressurized fluid from the interior of said conduit means to the exterior thereof in response to a decrease in pressure of fluid adjacent the exterior of said conduit means;

yieldable restraining means carried by said sample chamber side wall means, said restraining means being operable to yieldably prevent movement of said first and second sleeve valve means from said second, intermediate position to said third upper position, said restraining means being further operable to position said first and second sleeve valve means at said first, lower position in response to a relatively low pressure level in said well annulus, at said second, intermediate position in response to a relatively intermediate pressure level in said well annulus, and at said third, upper position in response to a relatively high pressure level in said well annulus;

yieldable movement impedance means operable to relatively impede initial upward movement of said piston means in said cylinder means and permit relatively unimpeded downward movement of said piston means in said cylinder means, said impedance means including disabling means operable to substantially vitiate the movement impeding operation of said impedance means after said yield-able restraining means has yielded to per-mit said first and second sleeve valve means to move from said second, intermediate position toward said third, upper position; and collapsible and extensible coupling means disposed between said conduit means and said floating work station.

19. Apparatus as described in claim 18 further comprising:

first, relatively large, fluid reaction surface means carried by said annular piston means and disposed in fluid communicating relation with said first expansible and contractible cavity means; and second, relatively small, fluid reaction surface means carried by said annular piston means and disposed in fluid communicating relation with said second expansible and contractible cavity means.

20. Apparatus as described in claim 19 further comprising:

submerged means operable to substantially prevent wave action induced forces from being transmitted from said floating work station to said conduit means.

*21. A method of testing a formation intersected by a well bore, said method comprising:*

*maintaining pressure in a body of fluid in a well bore, disposed adjacent a conduit means, at one level while maintaining said body of fluid isolated from a submerged formation to be tested and the interior of said conduit means;*

*in response to said one level of pressure in said body of fluid, maintaining a flow path leading from said formation through said conduit means in said well bore in a closed condition;*

*changing the pressure of said fluid body while isolating said change in pressure of said fluid body from said formation;*

*in response to said change in pressure, permitting fluid flow from said formation through said conduit means;*

*further changing the pressure of fluid in said fluid body while isolating said further change in pressure from said formation and the interior of said conduit means; and*

*in response to said further change of pressure of said fluid body,*

*entrapping within a closed sample chamber provided in said conduit means a sample of fluid from said formation, and*

*securing said sample chamber in said sample entrapping closed condition and preventing any subsequent opening thereof in response to subsequent pressure changes of said fluid body.*

*22. Apparatus for testing a formation intersected by a well bore, said apparatus comprising:*

*means for maintaining pressure in a body of fluid in a well bore, disposed adjacent a conduit means, at one level while maintaining said body of fluid isolated from a submerged formation to be tested and the interior of said conduit means;*

*means operable in response to said one level of pressure in said body of fluid, to maintain a flow path leading from said formation through said conduit means in said well bore in a closed condition;*

*means for changing the pressure of said fluid body while isolating said change in pressure of said fluid body from said formation;*

*means operable in response to said change in pressure, to permit fluid flow from said formation through said conduit means;*

*means for further changing the pressure of fluid in said fluid body while isolating said further change in pressure from said formation and the interior of said conduit means;*

*means, including a closeable sample chamber within said conduit means, operable in response to said further change of pressure of said fluid body, to close and entrap within said closeable sample chamber a sample of fluid from said formation; and*

*means for securing said sample chamber in said sample entrapping closed condition and for preventing any subsequent opening thereof in response to subsequent pressure changes of said fluid body.*

*23. In a method of offshore testing a submerged formation intersected by a submerged well bore, which method includes:*

*providing a formation fluid sample entrapping test string extending downwardly from floating vessel means; and*

*lowering said formation fluid sample entrapping test string from said floating vessel means through conduit means extending upwardly from a submerged well head installation to said floating vessel means;*

*the improvement in said method comprising:*

*providing a first annular fluid body within said formation fluid sample entrapping test string spaced from and disposed beneath said floating vessel means;*

*retrievably supporting said formation fluid sample entrapping test string within a submerged well bore intersecting a submerged formation to be tested,*

*with said first annular fluid body being located in said submerged well bore beneath a submerged well head installation and above a packer means, and with said packer means and said submerged well head installation isolating a well annulus portion of said submerged well bore beneath said submerged well head installation and above said packer means from the pressure of said submerged formation to be tested, which annulus portion encircles the outer periphery of said formation fluid sample entrapping test string;*

*said annulus portion*

*being wholly external of said formation fluid sample entrapping test string,*

*being located immediately adjacent a casing wall of said submerged well bore, and*

*defining a second annular body of fluid isolated from said submerged formation and from said conduit means extending upwardly from said submerged well head installation;*

*providing pressure opposing cooperation between said second annular body of fluid and said first annular body of fluid;*

*providing within said formation fluid sample entrapping test string a closeable sample chamber having*

*concurrently closeable and openable upper and lower ends, and*

*opening and closing means responsive to changes in pressure of said second annular body of fluid for alternately, concurrently opening and closing said upper and lower ends,*

*providing a flow path in said formation fluid sample entrapping test string operable to transmit formation fluid from said submerged formation to said closeable sample chamber within said formation fluid sample entrapping test string,*

*with said flow path extending axially of and through said first annular body of fluid and comprising the interior of said formation fluid sample entrapping test string;*

*continuously isolating said first annular body of fluid and said second annular body of fluid from fluid pressure of said submerged formation and fluid pres-*

*sure of said interior of said formation fluid sample entrapping test string;*

*opposing the pressure of fluid in said first annular fluid body with the pressure of fluid in said second annular fluid body and transmitting the resultant force of said opposing pressures to said closeable fluid sample chamber opening and closing means;*

*in response to the opposing influences of a lower pressure in said second annular body of fluid in said submerged well bore and pressure of said first annular fluid body, and while said first and second annular fluid bodies are continuously isolated from the fluid pressure of said submerged formation to be tested and said interior of said formation fluid sample entrapping test string,*

*causing said opening and closing means to close said upper and lower ends of said closeable sample chamber;*

*from said floating vessel means, raising the pressure of said second annular fluid body while continuously isolating said raise in pressure of said second annular fluid body from said submerged formation and said interior of said formation fluid sample entrapping test string;*

*in response to said raising of pressure in said second annular fluid body, and independent of pressure in said submerged formation and said interior of said formation fluid sample entrapping test string and, while isolating pressures in said submerged formation and said interior of said formation fluid sample entrapping test string from each of said first and second annular fluid bodies,*

*causing said opening and closing means to permit fluid to flow from said submerged formation through said flow path and axially through said first annular fluid body and through said closeable sample chamber;*

*from said floating vessel means, reducing the pressure of fluid in said second annular fluid body, while isolating said reduction in pressure therein from said submerged formation and from said interior of said formation fluid sample entrapping test string;*

*in response to said reducing of pressure in said second annular fluid body, and independent of pressures in said submerged formation and said interior of said formation fluid sample entrapping test string, and while isolating pressures in said submerged formation and said interior of said formation fluid entrapping test string from each of said first and second annular fluid bodies,*

*causing said opening and closing means to close said upper and lower ends of said closeable sample chamber and entrap a sample of fluid from said submerged formation therewithin;*

*from said floating vessel means, effecting a subsequent increase in pressure in said second annular fluid body; and*

*in response to said subsequent increase in pressure said second annular fluid body,*

*securing said opening and closing means in a condition closing said upper and lower ends of said closeable sample chamber, and*

*preventing further opening of said upper and lower ends of said closeable sample chamber while said closeable sample chamber remains in said submerged well bore, regardless of further pressure changes in said second annular fluid body.*

*24. In a method of offshore testing a submerged formation intersected by a submerged well bore, which method includes:*

*providing a formation fluid sample entrapping test string extending downwardly from floating vessel means; and*

*lowering said formation fluid sample entrapping test string from said floating vessel means through conduit means extending upwardly from a submerged well head installation to said floating vessel means;*

*the improvement in said method comprising:*

*providing a first fluid body within said formation fluid sample entrapping test string spaced from and disposed beneath said floating vessel means;*

*retrievably supporting said formation fluid sample entrapping test string within a submerged well bore intersecting a submerged formation to be tested,*

*with said first fluid body being located in said submerged well bore beneath a submerged well head installation and above a packer means, and*

*with said packer means and said submerged well head installation being disposed, respectively, below and above a well annulus portion of said submerged well bore, which annulus portion encircles the outer periphery of said formation fluid sample entrapping test string;*

*said annulus portion*

*being external of said formation fluid sample entrapping test string,*

*being located immediately adjacent a casing wall of said submerged well bore, and*

*defining a second annular body of fluid isolated from said submerged formation;*

*providing pressure opposing cooperation between said second annular body of fluid and said first body of fluid;*

*providing within said formation fluid sample entrapping test string a closeable sample chamber having*

*closeable and openable upper and lower ends, and*

*opening and closing means responsive to changes in pressure of said second annular body of fluid for alternately, opening and closing said upper and lower ends,*

*providing a flow path in the interior of said formation fluid sample entrapping test string operable to transmit formation fluid from said submerged formation to said closeable sample chamber within said formation fluid sample entrapping test string;*

*continuously isolating said first body of fluid and said second annular body of fluid from fluid pressure of said submerged formation and fluid pressure of said flow path of said formation fluid sample entrapping test string;*

*opposing the pressure of fluid in said first fluid body with the pressure of fluid in said second annular fluid body and transmitting the resultant force of said opposing pressures to said closeable fluid sample chamber opening and closing means;*

*in response to the opposing influences of a lower pressure in said second annular body of fluid in said submerged well bore and pressure of said first fluid body, and while said first fluid body and second annular fluid body are continuously isolated from the fluid pressure of said submerged formation to be tested and said flow path of sad formation fluid sample entrapping test string,*

*causing said opening and closing means to close said upper and lower ends of said closeable sample chamber;*

*from said floating vessel means, raising the pressure of said second annular fluid body while continuously isolating said raise in pressure of said second annular fluid body from said submerged formation and said flow path of said formation fluid sample entrapping test string;*

*in response to said raising of pressure in said second annular fluid body, and independent of pressure in said submerged formation and said flow path of said formation fluid sample entrapping test string and while isolating pressures in said submerged formation and said flow path of said formation fluid sample entrapping test string from each of said first fluid body and second annular fluid bodies,*

*causing said opening and closing means to permit fluid to flow from said submerged formation through said flow path and through said closeable sample chamber;*

*from said floating vessel means, reducing the pressure of fluid in said second annular fluid body, while isolating said reduction in pressure therein from said submerged formation and from said flow path of said formation fluid sample entrapping test string;*

*in response to said reducing of pressure in said second annular fluid body, and independent of pressures in said submerged formation and said flow path of said formation fluid sample entrapping test string, and while isolating pressures in said submerged formation and said flow path of said formation fluid entrapping test string from each of said first fluid body and second annular fluid body,*

*causing said opening and closing means to close said upper and lower ends of said closeable sample chamber and entrap a sample of fluid from said submerged formation therewithin;*

*from said floating vessel means, effecting a subsequent increase in pressure in said second annular fluid body; and*

*in response to said subsequent increase in pressure in said second annular fluid body,*

*securing said opening and closing means in a condition closing said upper and lower ends of said closeable sample chamber, and*

*preventing further opening of said upper and lower ends of said closeable sample chamber while said closeable sample chamber remains in said submerged well bore, regardless of further pressure changes in said second annular fluid body.*

*25. A method of offshore testing a submerged formation intersected by a submerged well bore, which method includes:*

*providing a formation fluid sample entrapping test string extending downwardly from floating vessel means; and*

*lowering said formation fluid sample entrapping test string from said floating vessel means through conduit means extending upwardly from a submerged well head installation to said floating vessel means;*

*the improvement in said method comprising:*

*providing a first fluid body within said formation fluid sample entrapping test string spaced from and disposed beneath said floating vessel means;*

*retrievably supporting said formation fluid sample entrapping test string within a submerged well bore intersecting a submerged formation to be tested, with said first fluid body being located in said submerged well bore beneath a submerged well head installation and above a packer means, and*

*with said packer means and said submerged well head installation being disposed, respectively, below and above a well annulus portion of said submerged well bore, which annulus portion encircles the outer periphery of said formation fluid sample entrapping test string;*

*said annulus portion*

*being external of said formation fluid sample entrapping test string,*

*being located immediately adjacent a casing wall of said submerged well bore, and*

*defining a second annular body of fluid isolated from said submerged formation;*

*providing pressure opposing cooperation between said second annular body of fluid and said first body of fluid;*

*providing within said formation fluid sample entrapping test string a closeable sample chamber having closeable and openable upper and lower ends, and opening and closing means responsive to changes in pressure of said second annular body of fluid for alternately, opening and closing said upper and lower ends,*

*providing a flow path in tne interior of said formation fluid sample entrapping test string operable to transmit formation fluid from said submerged formation to said closeable sample chamber within said formation fluid sample entrapping test string;*

*continuously isolating said first body of fluid and said second annular body of fluid from fluid pressure of said submerged formation and fluid pressure of said flow path of said formation fluid sample entrapping test string;*

*opposing the pressure of fluid in said first fluid body with the pressure of fluid in said second annular fluid body and transmitting the resultant force of said opposing pressures to said closeable fluid sample chamber opening and closing means;*

*in response to the opposing influences of pressure in said second annular body of fluid in said submerged well bore and pressure of said first fluid body, and while said first fluid body and second annular fluid body are continuously isolated from the fluid pressure of said submerged formation to be tested and said flow path of said formation fluid sample entrapping test string,*

*causing said opening and closing means to close said upper and lower ends of said closeable sample chamber;*

*from said floating vessel means, raising the pressure of said second annular fluid body while continuously isolating said raise in pressure of said second annular fluid body from said submerged formation and said flow path of said formation fluid sample entrapping test string;*

*in response to said raising of pressure in said second annular fluid body, and independent of pressure in said submerged formation and said flow path of said formation fluid sample entrapping test string and, while isolating pressures in said submerged formation and said flow path of said formation fluid sample entrapping test string from each of said first fluid body and second annular fluid body,*

*causing said opening and closing means to permit fluid to flow from said submerged formation*

*through said flow path and through said closeable sample chamber;*

*from said floating vessel means, changing the pressure of fluid in said second annular fluid body, while isolating said change in pressure therein from said submerged formation and from said flow path of said formation fluid sample entrapping test string;*

*in response to said changing of pressure in said second annular fluid body, and independent of pressures in said submerged formation and said flow path of said formation fluid sample entrapping test string, and while isolating pressures in said submerged formation and said flow path of said formation fluid entrapping test string from each of said first fluid body and second annular fluid body,*

*causing said opening and closing means to close said upper and lower ends of said closeable sample chamber and entrap a sample of fluid from said submerged formation therewith.*

*26. In an apparatus for offshore testing a submerged formation intersected by a submerged well bore, said apparatus includes:*

*floating vessel means;*

*a submerged well head installation;*

*a casing wall extending downwardly from said submerged well head installation into a submerged well bore; with*

*said submerged well bore intersecting a submerged formation to be tested;*

*conduit means extending upwardly from said submerged well head installation to said floating vessel means; and*

*a formation fluid sample entrapping test string extending downwardly from said floating vessel means through said conduit means and into said submerged well bore, said sample entrapping test string*

*including and supporting releasable packer means,*

*extending through said submerged well head installation, and*

*being sealingly and releasably connected to said casing wall by said packer means;*

*the improvement in said apparatus comprising:*

*a first annular fluid body disposed within said formation fluid sample entrapping test string spaced from and disposed beneath said floating vessel means;*

*means retrievably supporting said formation fluid sample entrapping test string within said submerged well bore,*

*with said first annular fluid body being located in said submerged well bore beneath said submerged well head installation and above said packer means, and*

*with said packer means and said submerged well head installation isolating a well annulus portion of said submerged well bore beneath said submerged well head installation and above said packer means from the pressure of said submerged formation to be tested, which annulus portion encircles the outer periphery of said formation fluid sample entrapping test string;*

*said annulus portion*

*being wholly external of said formation fluid sample entrapping test string,*

*being located immediately adjacent a casing wall of said submerged well bore, and*

*defining a second annular body of fluid isolated from said submerged formation and from said conduit means extending upwardly from said submerged well head installation;*

*means providing pressure opposing cooperation between said second annular body of fluid and said first annular body of fluid;*

*means providing, within said formation fluid sample entrapping test string, a closeable sample chamber having*

*concurrently closeable and openable upper and lower ends, and*

*opening and closing means responsive to changes in pressure of said second annular body of fluid for alternately, concurrently opening and closing said upper and lower ends,*

*means providing a flow path in said formation fluid sample entrapping test string operable to transmit formation fluid from said submerged formation to said closeable sample chamber within said formation fluid sample entrapping test string,*

*with said flow path extending axially of and through said first annular body of fluid and comprising the interior of said formation fluid sample entrapping test string;*

*means for continuously isolating said first annular body of fluid and said second annular body of fluid from fluid pressure of said submerged formation and fluid pressure of said interior of said formation fluid sample entrapping test string;*

*means for opposing the pressure of fluid in said first annular fluid body with the pressure of fluid in said second annular fluid body and transmitting the resultant force of said opposing pressures to said closeable fluid sample chamber opening and closing means;*

*means operable in response to the opposing influences of a lower pressure in said second annular body of fluid in said submerged well bore and pressure of said first annular fluid body, and while said first and second annular fluid bodies are continuously isolated from the fluid pressure of said submerged formation to be tested and said interior of said formation fluid sample entrapping test string, to*

*cause said opening and closing means to close said upper and lower ends of said closeable sample chamber;*

*means operable from said floating vessel means to raise the pressure of said second annular fluid body while continuously isolating said raise in pressure of said second annular fluid body from said submerged formation and said interior of said formation fluid sample entrapping test string;*

*means operable, in response to said raising of pressure in said second annular fluid body, and independent of pressure in said submerged formation and said interior of said formation fluid sample entrapping test string and, while isolating pressures in said submerged formation and said interior of said formation fluid sample entrapping test string from each of said first and second annular fluid bodies, to*

*cause said opening and closing means to permit fluid to flow from said submerged formation through said flow path and axially through said first annular fluid body and through said closeable sample chamber;*

*means operable from said floating vessel means to reduce the pressure of fluid in said second annular fluid body, while isolating said reduction in pressure therein from said submerged formation and from said interior of said formation fluid sample entrapping test string;*

*means operable in response to said reducing of pressure in said second annular fluid body, and independent of pressures in said submerged formation and said interior of said formation fluid sample entrapping test string, and while isolating pressures in said submerged formation and said interior of said formation fluid entrapping test string from each of said first and second annular fluid bodies, to*

*cause said opening and closing means to close said upper and lower ends of said closeable sample chamber and entrap a sample of fluid from said submerged formation therewithin;*

*means operable from said floating vessel means to effect a subsequent increase in pressure in said second annular fluid body; and*

*means operable in response to said subsequent increase in pressure in said second annular fluid body, to*

*secure said opening and closing means in a condition closing said upper and lower ends of said closeable sample chamber, and*

*prevent further opening of said upper and lower ends of said closeable sample chamber while said closeable sample chamber remains in said submerged well bore, regardless of further pressure changes in said second annular fluid body.*

*27. In an apparatus for offshore testing a submerged formation intersected by a submerged well bore, which apparatus includes:*

*a floating vessel means;*

*a submerged well head installation;*

*a casing wall exending downwardly from said submerged well head installation into a submerged well bore; with*

*said submerged well bore intersecting a submerged formation to be tested;*

*conduit means extending upwardly from said submerged well head installation to said floating vessel means; and*

*a formation fluid sample entrapping test string extending downwardly from said floating vessel means through said conduit means and into said submerged well bore, said sample entrapping test string*

*including and supporting releasable packer means, extending through said submerged well head installation, and*

*being sealingly and releasably connected to said casing wall by said packer means;*

*the improvement in said apparatus comprising:*

*a first fluid body disposed within said formation fluid sample entrapping test string spaced from and disposed beneath said floating vessel means;*

*means retrievably supporting said formation fluid sample entrapping test string within said submerged well bore,*

*with said first fluid body being located in said submerged well bore beneath aid submerged well head installation and above said packer means, and*

*with said packer means and said submerged well head installation being disposed, respectively, below and above a well annulus portion of said submerged well bore, which annulus portion encircles the outer periphery of said formation fluid sample entrapping test string;*

*said annulus portion*

*being external of said formation fluid sample entrapping test string,*

*being located immediately adjacent a casing wall of said submerged well bore, and*

*defining a second annular body of fluid isolated from said submerged formation;*

*means providing pressure opposing cooperation between said second annular body of fluid and said first body of fluid;*

*means providing, within said formation fluid sample entrapping test string, a closeable sample chamber having*

*closeable and openable upper and lower ends, and*

*opening and closing means responsive to changes in pressure of said second annular body of fluid for alternately, opening and closing said upper and lower ends,*

*means providing a flow path in the interior of said formation fluid sample entrapping test string operable to transmit formation fluid from said submerged formation to said closeable sample chamber within said formation fluid sample entrapping test string;*

*means for continuously isolating said first body of fluid and said second annular body of fluid from fluid pressure of said submerged formation and fluid pressure of said flow path of said formation fluid sample entrapping test string;*

*means for opposing the pressure of fluid in said first fluid body with the pressure of fluid in said second annular fluid body and transmitting the resultat force of said opposing pressures to said closeable fluid sample chamber opening and closing means;*

*means operable in response to the opposing influences of a lower pressure in said second annular body of fluid in said submerged well bore and pressure of said first fluid body, and while said first fluid body and second annular fluid body are continuously isolated from the fluid pressure of said submerged formation to be tested and said flow path of said formation fluid sample entrapping test string,*

*to cause said opening and closing means to close said upper and lower ends of said closeable sample chamber;*

*means operable from said floating vessel means to raise the pressure of said second annular fluid body while continuously isolating said raise in pressure of said second annular fluid body from said submerged formation and said flow path of said formation fluid sample entrapping test string;*

*means operable, in response to said raising of pressure in said second annular fluid body, and independent of pressure in said submerged formation and said flow path of said formation fluid sample entrapping test string and, while isolating pressures in said submerged formation and said flow path of said formation fluid sample entrapping test string from each of said first fluid body and second annular fluid body, to*

*cause said opening and closing means to permit fluid to flow from said submerged formation through said flow path and through said closeable sample chamber;*

*means operable from said floating vessel means to reduce the pressure of fluid in said second annular fluid body, while isolating said reduction in pressure therein from said submerged formation and from said flow path of said formation fluid sample entrapping test string;*

*means operable in response to said reducing of pressure in said second annular fluid body, and independent of pressures in said submerged formation and said flow path of said formation fluid sample entrapping test string, and while isolating pressures in said submerged*

*formation and said flow path of said formation fluid entrapping test string from each of said first fluid body and second annular fluid body, to*

*cause said opening and closing means to close said upper and lower ends of said closeable sample chamber and entrap a sample of fluid from said submerged formation therewithin;*

*means operable from said floating vessel means to effect a subsequent increase in pressure in said second annular fluid body; and*

*means operable in response to said subsequent increase in pressure in said second annular fluid body, to*

*secure said opening and closing means in a condition closing said upper and lower ends of said closeable sample chamber, and*

*prevent further opening of said upper and lower ends of said closeable sample chamber while said closeable sample chamber remains in said submerged well bore, regardless of further pressure changes in said second annular fluid body.*

*28. In an apparatus for offshore testing a submerged formation intersected by a submerged well bore, which apparatus includes:*

*floating vessel means;*

*a submerged well head installation;*

*a casing wall extending downwardly from said submerged well head installation into a submerged well bore; with*

*said submerged well bore intersecting a submerged formation to be tested*

*conduit means extending upwardly from said submerged well head installation to said floating vessel means; and*

*a formation fluid sample entrapping test string extending downwardly from said floating vessel means through said conduit means and into said submerged well bore, and said sample entrapping test string including and supporting releasable packer means extending through said submerged well head installation, and*

*being sealingly and releasably connected to said casing wall by said packer means;*

*the improvement in said apparatus comprising:*

*a first fluid body disposed within said formation fluid sample entrapping test string spaced from and disposed beneath said floating vessel means;*

*means retrievable supporting said formation fluid sample entrapping test string within said submerged well bore,*

*with said first fluid body being located in said submerged well bore beneath said submerged well head installation and above said packer means, and*

*with said packer means and said submerged well head installation being disposed, respectively, below and above a well annulus portion of said submerged well bore, which annulus portion encircles the outer periphery of formation fluid sample entrapping test string;*

*said annulus portion*

*being external of said formation fluid sample entrapping test string,*

*being located immediately adjacent a casing wall of said submerged well bore, and*

*defining a second annular body of fluid isolated from said submerged formation;*

*means providing pressure opposing cooperation between said second annular body of fluid and said first body of fluid;*

*means providing, within said formation fluid sample entrapping test string, a closeable sample chamber having*

*closeable and openable upper and lower ends, and*

*opening and closing means responsive to changes in pressure of said second annular body of fluid for alternately opening and closing said upper and lower ends,*

*means providing a flow path in the interior of said formation fluid sample entrapping test string operable to transmit formation fluid from said submerged formation to said closeable sample chamber within said formation fluid sample entrapping test string;*

*means for continuously isolating said first body of fluid and said second annular body of fluid from fluid pressure of said submerged formation and fluid pressure of said flow path of said formation fluid sample entrapping test string;*

*means for opposing the pressure of fluid in said first fluid body with the pressure of fluid in said second annular fluid body and transmitting the resultant force of said opposing pressures to said closeable fluid sample chamber opening and closing means;*

*means operable in response to the opposing influences of pressure in said second annular body of fluid in said submerged well bore and pressure of said first fluid body, and while said first fluid body and second annular fluid body are continuously isolated from the fluid pressure of said submerged formation to be tested and said flow path of said formation fluid sample entrapping test string, to*

*cause said opening and closing means to close said upper and lower ends of said closeable sample chamber;*

*means operable from said floating vessel means to raise the pressure of said second annular fluid body while continuously isolating said raise in pressure of said second annular fluid body from said submerged formation and said flow path of said formation fluid sample entrapping test string;*

*means operable, in response to said raising of pressure in said second annular fluid body, and independent of pressure in said submerged formation and said flow path of said formation fluid sample entrapping test string and while isolating pressures in said submerged formation and said flow path of said formation fluid sample entrapping test string from each of said first fluid body and second annular fluid body, to*

*cause said opening and closing means to permit fluid to flow from said submerged formation through said flow path and through said closeable sample chamber;*

*means operable from said floating vessel means to change the pressure of fluid in said second annular fluid body, while isolating said change in pressure therein from said submerged formation and from said flow path of said formation fluid sample entrapping test string;*

*means operable in response to said changing of pressure in said second annular fluid body, and independent of pressures in said submerged formation and said flow path of said formation fluid sample entrapping test string, and while isolating pressures in said submerged formation and said flow path of said formation fluid entrapping test string from each of said first fluid body and second annular fluid body, to*

*cause said opening and closing means to close said upper and lower ends of said closeable sample*

*chamber and entrap a sample of fluid from said submerged formation therewithin.*

*29. A method of testing a submerged formation intersected by a well bore having a lower portion extending from the sea floor to the formation to be tested and an upper well bore portion extending from the sea floor to a work station at the surface of the sea, said method comprising:*

*maintaining pressure in a body of fluid in said well bore, disposed in an annulus of said well bore external of a conduit means and adjacent a casing lining the lower portion of said well bore, at one level while maintaining said body of fluid isolated from said submerged formation to be tested, the interior of said conduit means and said upper well bore portion;*

*in response to said one level of pressure in said body of fluid, maintaining a flow path leading from said formation through said conduit means in said well bore in a closed condition;*

*changing the pressure of said fluid body while isolating said change in pressure of said fluid body from said formation, the flow path through said conduit means and said upper well bore portion;*

*in response to said change in pressure, permitting fluid to flow from said formation through said conduit means;*

*further changing the pressure of fluid in said fluid body while isolating said further change in pressure from said formation, the flow path through said conduit means and said upper well bore portion;*

*in response to said further change of pressure of said fluid body and independent of the pressure in the flow path through said conduit means, entrapping between upper and lower valve means within said conduit means located in said well bore adjacent said fluid filled annulus, a sample of fluid from said formation.*

*30. A method of testing a submerged formation from an offshore test site having an upper well bore portion extending from a work station at the surface of the sea to the sea floor and a submerged well bore extending from the sea floor to the formation to be tested, said method comprising:*

*maintaining pressure in a body of fluid in said submerged well bore, disposed in an annulus of said submerged well bore external of a conduit means and adjacent a casing lining said submerged well bore, at a relatively low level while maintaining said body of fluid isolated from said submerged formation to be tested, the interior of said conduit means and said upper well bore portion;*

*in response to said relatively low level of pressure in said body of fluid, maintaining a flow path leading from said formation through said conduit means in said submerged well bore in a closed condition;*

*increasing the pressure of said fluid body while isolating said increase in pressure of said fluid body from said formation, the flow path through said conduit means and said upper well bore portion;*

*in response to said increase in pressure, permitting fluid to flow from said formation through said conduit means;*

*decreasing the pressure of fluid in said fluid body while isolating said decrease in pressure from said formation, the flow path through said conduit means and said upper well bore portion; and*

*in response to said decrease of pressure of said fluid body and independent of the pressure in the flow path through said conduit means, entrapping between upper and lower valve means within said conduit means located in said well bore adjacent said fluid filled annulus, a sample of fluid from said formation.*

*31. Apparatus for testing a submerged formation intersected by a well bore having a lower portion extending from the sea floor to the formation to be tested and an upper well bore portion extending from the sea floor to a work station at the surface of the sea, said apparatus comprising:*

*conduit means in said well bore having a flow path therethrough for providing a fluid passageway from said formation through said well bore;*

*means for maintaining pressure in a body of fluid in said well bore, disposed in an annulus of said well bore external of said conduit means and adjacent a casing lining the lower portion of said well bore, at one level while maintaining said body of fluid isolated from said submerged formation to be tested, the flow path through said conduit means and said upper well bore portion;*

*means operable in response to said one level of pressure in said body of fluid, to maintain said flow path leading from said formation through said conduit means in said well bore in a closed condition;*

*means for changing the pressure of said fluid body while isolating said change in pressure of said fluid body from said formation, the flow path through said conduit means and said upper well bore portion;*

*means operable in response to said change in pressure, to permit fluid to flow from said formation through said conduit means;*

*means for further changing the pressure of fluid in said fluid body while isolating said further change in pressure from said formation, the flow path through said conduit means and said upper well bore portion; and*

*means, including upper and lower valve means located in said conduit means adjacent said fluid filled annulus, operable in response to said further change of pressure of said fluid body independent of the pressure in the flow path through said conduit means, to entrap between said upper and lower valve means within said conduit means a sample of fluid from said formation.*

*32. Apparatus for testing a submerged formation from an offshore test site having an upper well bore portion extending from a work station at the surface of the sea to the sea floor and a submerged well bore extending from the sea floor to the formation to be tested, said apparatus comprising:*

*conduit means in said well bores having a flow path therethrough for providing a fluid passageway from said formation through said well bores;*

*means for maintaining pressure in a body of fluid in said submerged well bore, disposed in an annulus of said submerged well bore external of said conduit means and adjacent a casing lining said submerged well bore, at a relatively low level while maintaining said body of fluid isolated from said formation to be tested, the flow path through said conduit means and said upper well bore portion;*

*means operable in response to said relatively low level of pressure in said body of fluid, to maintain said flow path leading from said formation through said conduit means in said submerged well bore in a closed condition;*

*means for increasing the pressure of said fluid body while isolating said increase in pressure of said fluid body from said formation, the flow path through said conduit means and said upper well bore portion;*

*means operable in response to said increase in pressure to permit fluid to flow from said formation through said conduit means;*

*means for decrasing the pressure of fluid in said fluid body while isolating said decrease in pressure from said formation, the flow path through said conduit means and said upper well bore portion;*

*means, including upper and lower valve means located in said conduit means adjacent said fluid filled annulus, operable in response to said decrease of pressure of said fluid body independent of the pressure in the flow path through said conduit means, to entrap between said upper and lower valve means within said conduit means a sample of fluid from said formation.*

* * * * *